US010692043B1

(12) United States Patent
Woodyard et al.

(10) Patent No.: US 10,692,043 B1
(45) Date of Patent: Jun. 23, 2020

(54) INTELLIGENT INVENTORY MANAGEMENT

(71) Applicant: Square, Inc., San Francisco, CA (US)

(72) Inventors: Christopher Woodyard, Hoboken, NJ (US); Cynthia Lobb, Marietta, GA (US); Roshan Jhunja, Scarsdale, NY (US); John Joseph Labanca, Jr., Dunwoody, GA (US); Brad Seiler, New York, NY (US); Noah Batterson, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 180 days.

(21) Appl. No.: 15/673,203

(22) Filed: Aug. 9, 2017

(51) Int. Cl.
    *G06Q 10/08* (2012.01)
    *G06Q 10/06* (2012.01)
    *G06Q 20/20* (2012.01)
    *G06Q 30/06* (2012.01)
    *G06Q 30/02* (2012.01)
    *G06Q 50/28* (2012.01)

(52) U.S. Cl.
    CPC ... *G06Q 10/0875* (2013.01); *G06Q 10/06315* (2013.01); *G06Q 20/203* (2013.01); *G06Q 30/0283* (2013.01); *G06Q 30/06* (2013.01); *G06Q 50/28* (2013.01)

(58) Field of Classification Search
    None
    See application file for complete search history.

(56) References Cited

U.S. PATENT DOCUMENTS

| | | | | |
|---|---|---|---|---|
| 6,405,178 B1* | 6/2002 | Manchala | ............ | G06Q 10/087 705/26.1 |
| 6,418,416 B1* | 7/2002 | Rosenberg | ........... | G06Q 10/087 705/22 |
| 8,229,781 B2 | 7/2012 | Zenor et al. | | |
| 9,792,545 B1 | 10/2017 | Sherman et al. | | |
| 2003/0101107 A1* | 5/2003 | Agarwal | ............. | G06Q 10/087 705/28 |
| 2003/0187740 A1 | 10/2003 | Tanahashi et al. | | |

(Continued)

OTHER PUBLICATIONS

Non-Final Office Action dated Feb. 6, 2018, for U.S. Appl. No. 15/673,179, of Woodyard, C., et al., filed Aug. 9, 2017.

(Continued)

*Primary Examiner* — Paul Danneman
(74) *Attorney, Agent, or Firm* — Lee & Hayes, P.C.

(57) ABSTRACT

This disclosure describes techniques for performing intelligent rebalancing of items between physical locations of merchants and replenishment of items for physical locations of merchants. The techniques include the use of a payment service that provides various services for merchants and obtains information associated with transactions of the merchants, employees of the merchants, and vendors of the merchants. Harnessing the information and knowledge associated with the variety of merchants, the payment service may intelligently automate the rebalancing items between physical locations, such as by moving items from a physical location of the merchant with a lower rate of sale to another physical location of the merchant with a higher rate of sale. Similarly, the payment service may intelligently automate replenishment of items by generating orders to have vendors fulfill needed quantities of items at locations of merchants.

20 Claims, 11 Drawing Sheets

(56) References Cited

U.S. PATENT DOCUMENTS

| | | |
|---|---|---|
| 2006/0010027 A1 | 1/2006 | Redman |
| 2006/0122881 A1 | 6/2006 | Walker et al. |
| 2010/0306078 A1 | 12/2010 | Hwang |
| 2012/0209734 A1 | 8/2012 | Brooks et al. |
| 2013/0006801 A1 | 1/2013 | Solari et al. |
| 2013/0090968 A1 | 4/2013 | Borza |
| 2013/0226655 A1 | 8/2013 | Shaw |
| 2014/0067467 A1 | 3/2014 | Rangarajan et al. |
| 2014/0222710 A1 | 8/2014 | Wheelock et al. |
| 2015/0242899 A1 | 8/2015 | Farhi |
| 2016/0104175 A1 | 4/2016 | Fanourgiakis et al. |
| 2016/0212266 A1 | 7/2016 | Soundar |
| 2018/0365755 A1 | 12/2018 | Bekbolatov et al. |

OTHER PUBLICATIONS

Non-Final Office Action dated Nov. 8, 2017, for U.S. Appl. No. 14/568,545, of Prang, J.D., et al., filed Dec. 12, 2014.

Final Office Action dated Jul. 9, 2018, for U.S. Appl. No. 14/568,545, of Prang, J.D., et al., filed Dec. 12, 2014.

Final Office Action dated Aug. 14, 2018, for U.S. Appl. No. 15/673,179, of Woodyard, C., et al., filed Aug. 9, 2017.

Non-Final Office Action dated Feb. 15, 2019, for U.S. Appl. No. 15/673,179 of Woodyard, C., et al., filed Aug. 9, 2017.

Non-Final Office Action dated Jun. 6, 2019, for U.S. Appl. No. 14/568,545, of Prang, J.D., et al., filed Dec. 12, 2014.

Final Office Action dated Jul. 12, 2019, for U.S. Appl. No. 15/673,179, of Woodyard, C., et al., filed Aug. 9, 2017.

\* cited by examiner

INTELLIGENT INVENTORY MANAGEMENT

BACKGROUND

Merchants conduct transactions with customers for various types of goods and services at physical establishments or locations of the merchants. These merchants often attempt to maintain certain levels of inventory at each of their locations so that the merchants are able to provide items (e.g., goods or services) to a customer. For instance, a merchant may order additional inventory from a vendor for an item when the merchant notices that the inventory is getting relatively low. However, keeping track of inventory is complicated and difficult, and often times merchants have insufficient amounts of inventory for an item, or too much inventory for an item. Insufficient inventory potentially results in lost sales, while maintaining large inventory is expensive and may prevent the merchant from making other business purchases, such as new equipment, marketing materials, rental space, and so on.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
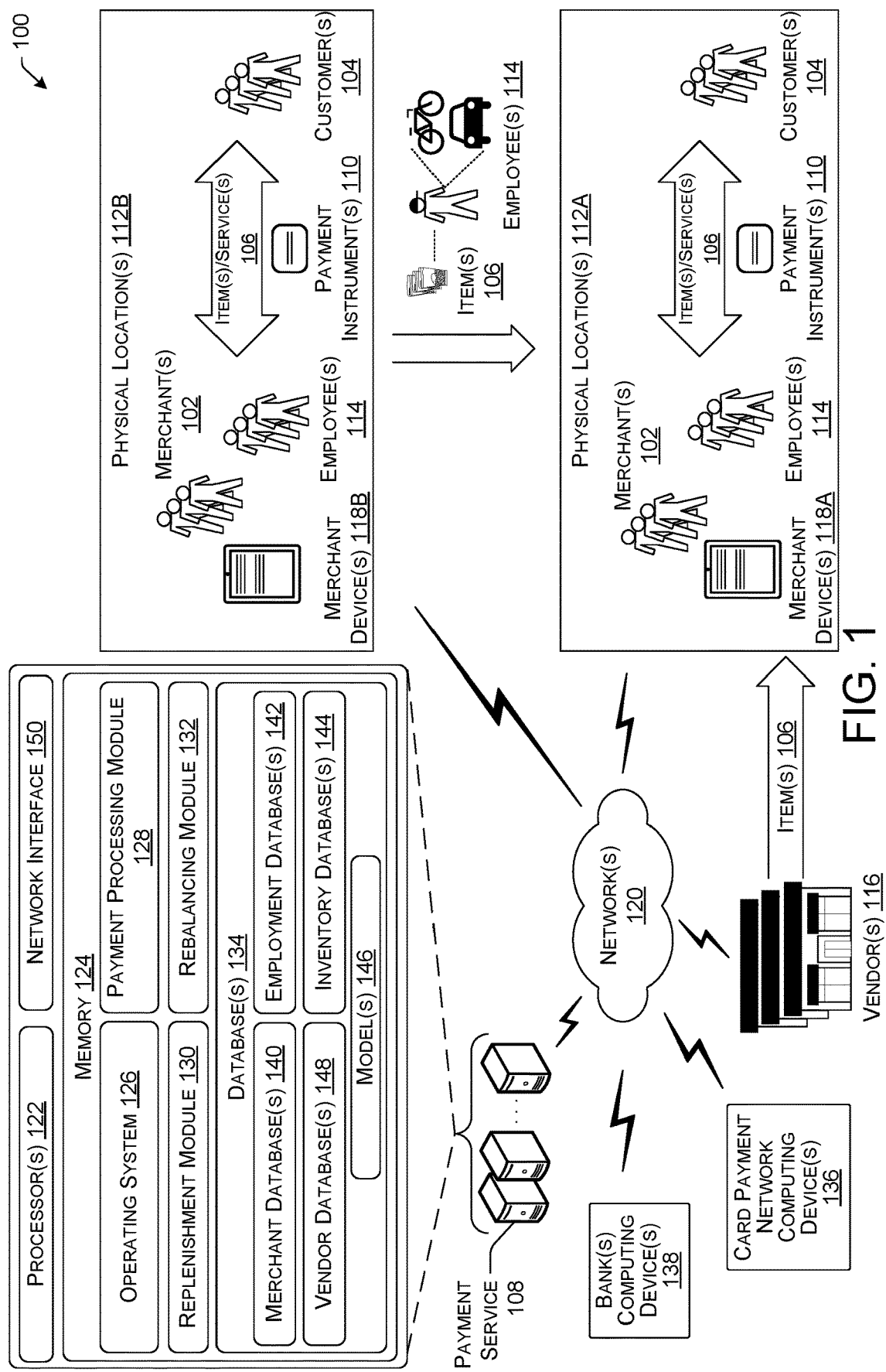
FIG. 1 illustrates an example environment illustrating techniques for rebalancing inventory between physical locations of merchants and replenishing inventory of physical locations of merchants.

This disclosure describes, in part, techniques for intelligently rebalancing inventory between physical locations of merchants, and intelligently replenishing inventory for physical locations of merchants. For example, if a particular item is selling well at one physical location of a merchant, but not selling as well at another physical location of the merchant, then a transfer order may be generated to initiate a transfer of the item from the slower selling location to the location at which the item is selling well. In some examples, item inventories for items at physical locations of merchants may be monitored, and if inventory for an item falls below a reorder limit, a purchase order may be automatically generated and sent to a vendor. In some examples, some of the techniques described herein may be performed by a third-party payment service, and without input from a merchant, to automate aspects of inventory management.

In some examples, the payment service may offer various services to merchants, such as processing payments on behalf of merchants with their customers, managing employee shift schedules or employee compensation, sending purchase orders to vendors, etc. In this way, the payment service, which may comprise a cloud-based service, collects a variety of data for merchants located in geographically disparate locations across cities, states, or countries. The unique placement of the payment service, and the unique services provided the payment service, may result in the payment service having access to large amounts of information and knowledge that individual merchants are unable to obtain or harness on their own. In this way, unique insights and analytics may be performed by the payment service to provide merchants with intelligent services and recommendations.

As noted above, managing inventory may be complicated and difficult, and merchants who are running a business may not have the time, knowledge, or capabilities to intelligently manage their inventory. Even further, merchants do not have access to the type of information and/or knowledge to manage their inventory efficiently and effectively. The techniques described herein for intelligently rebalancing inventory between locations of merchants, and intelligently facilitating replenishment of inventory at locations of merchants, may be performed by a payment service in a more efficient and effective way than what individual merchants are capable of performing on their own.

In some instances, the payment service may provide payment transaction services to enable merchants to perform transactions with customers using point-of-sale (POS) devices. The payment service may store information about these payment transactions between the merchants and the customers. Thus, the payment service may have knowledge for many different types of merchants, in many different industries, and across geographically disparate locations. The payment service may harness this information to intelligently rebalance inventory for merchants between their physical locations.

In some examples, the payment service may analyze the payment transactions of a merchant and track sales of items for the merchant at their respective locations. The payment service may identify rates of sale at which particular items are selling at the different locations. In some examples, the payment service may further track the inventory of items that the merchant has at respective locations based on analyzing the payment transactions for items sold by the merchant. The payment service may determine that a particular location of the merchant is selling an item at a higher rate of sale than another location of the merchant. Based on the different rates of sales, the payment service may determine that inventory of the item stored at the location with the lower rate of sale (e.g., "slower location") should be transferred to be included in the inventory of the item stored at the location with the higher rate of sale (e.g., "faster location"). In this way, inventory may be rebalanced between locations, which results in more effective sales of items for the merchant.

In various examples, the payment service may, based on the rate of sales for the slower location and the faster location and without merchant input, generate a transfer order that instructs the slower location to transfer a particular quantity of an item to the faster location. The payment service may then send the transfer order to a point-of-sale (POS) device at the slower location to initiate the transfer of the particular quantity of the item.

In various examples, the payment service may use different types of data to determine a quantity of the item to send from the slower location to the fast location. For instance, the payment service may analyze various models associated with the faster location, such as a weather model indicating predicted or historical weather patterns for the faster location and/or slower location, a calendar model indicating future events for the faster location which may increase a rate of sale of the item, a holiday model indicating future holidays which may affect the rate of sale for the item at the faster location, etc. As an example, the merchant may specialize in selling outdoor recreational products, and the faster selling location may have an event scheduled, and included in the calendar model, for a rafting event. The particular item may be a raft, and the payment service may determine to increase the particular quantity of rafts sent from the slower location to the faster location based on determining that the event will increase the rate of sale of rafts.

In some examples, the payment service may include other types of information in the transfer order other than the particular quantity of the item to be sent from the slower location to the faster location. For instance, the payment service may determine a transportation means that may be convenient to use for transporting the particular quantity of the item. In one example, the payment service may identify an already scheduled transportation of another item from the slower location to the faster location using a courier service. The payment service may include a recommendation to include the particular quantity of the item in that transportation by the courier service. In another example, the payment service many analyze an employee information database associated with the merchant to determine an employee to transport the particular quantity of the item. For example, the payment service may determine that a particular employee works one or more shifts at each of the slower and faster locations, such as swing shift, in the near-future where the employee's shift begins at the slower location and ends at the faster location. The transfer order may include a recommendation to have the particular employee transfer the particular quantity of the item when they leave their shift at the slower location and begin their shift at the faster location. In this way, the payment service is able to harness unique data to suggest transportation methods to efficiently carry out the transfer order.

In some examples, the transfer order may be sent to a POS device at the slower location, and be populated on the screen of the POS device to initiate the transfer of the particular quantity of the item. An employee, or the merchant, may send feedback to the payment service via the POS device indicating that the transfer order has been initiated (e.g., begun processing), and further provide input indicating that the transfer of the particular quantity of the item has begun when the employee or courier service begins the transfer.

Once the transfer of the particular quantity of the item has been completed and the items are at the faster, or better-selling location, an employee or the merchant at the faster location may send an indication, via a POS device at the faster location, to the payment service indicating that the particular quantity of the item has arrived at the faster location. In response to receiving this request, the payment service may update an inventory database stored by the payment service to indicate the updated quantity of the items at the slower location and the faster location.

In some examples, the payment service may provide further services to the merchant with respect to rebalancing of items. For instance, the merchant may be starting a new location at a geographic location where the merchant has not previously had a location. Thus, the merchant may be unsure what types of sales to expect, and how much inventory of an item to have on hand. The payment service may receive an indication of the new location, such as by receiving a request to register a new POS device at the new location, and determine how to rebalance items between locations of the merchant. As an example, the payment service may analyze transaction data and inventory data for other merchants who have locations within a threshold proximity to the new location of the merchant. The payment service may identify inventories of those other merchants, and/or rates of sale for items offered for sale by those merchants, and determine a quantity of an item that the merchant should offer for sale at their new location based on inventories and/or rates of sale for that item, or similar items, by other merchants proximate to the new location of the merchant. Further, the payment service may generate and send a transfer order to another location of the merchant to initiate transfer of the quantity of the item to go to the new location for rebalancing. In this way, the payment service may harness data and knowledge that is unavailable to the merchant to provide intelligent rebalancing for the merchant who is opening a new location.

As noted above, the payment service may further perform intelligent replenishment of items on behalf of merchants. Traditionally, a merchant may manually attempt to monitor their inventory in their physical locations, and determine to order more items from vendors when they notice item inventory is low. However, this is cumbersome and may result in insufficient inventory of items, or extra inventory of items. In some examples, the payment service may intelligently monitor inventories of items, and perform automated replenishment of items. As an example, the payment service may determine minimum thresholds of items that a merchant should have in an item inventory associated with a location of the merchant. In some examples, the payment service may determine this minimum threshold based on rates of sale for that item by the merchant, rates of sale of that item or similar items by other merchants proximate to the location of the merchant, or on other factors. By analyzing the transactions performed on behalf of the merchant and monitoring item inventories of the merchant, the payment service may determine that an item inventory has dropped below the minimum threshold of items, and automatically generate, without input from the merchant, an order to send to a vendor for acquisition of more of a particular item.

In some examples, the payment service may dynamically determine and/or modify the minimum and maximum thresholds for a merchant's item inventory. For instance, if a rate of sale for an item at a location has increased over time the minimum and/or maximum thresholds may increase, and if the rate of sale for the item has decreased over time, the minimum and/or maximum thresholds may decrease. In some examples, the payment service may predictively adjust the minimum and/or maximum thresholds based on events which may cause a change in a rate of sale of an item. For instance, the payment service may analyze the various models, such as a weather model indicating predicted or historical weather patterns for a location of the merchant, a calendar model indicating future events for the location of the merchant which may change a rate of sale of the item, a holiday model indicating future holidays which may affect the rate of sale for the item at the faster location, etc. For instance, if winter is coming in a location of a merchant which experiences cold temperatures, the payment service may increase the minimum and maximum item thresholds for jackets that a merchant sells at the location. In this way, the payment service may dynamically ensure that appropriate amounts of items are in a merchant's inventory for various locations of the merchant without user input.

In some instances, the payment system may determine that an inventory of an item sold at a location of a merchant is approaching, or has fallen below, the minimum threshold of items that the merchant should have at their location. The payment service may analyze the inventory database to determine a current quantity of items at the location of the merchant, and based on the maximum threshold of items and the current quantity, determine a needed quantity of items for the location of the merchant. The payment service may then automatically generate an order indicating the needed quantity of the items and send the order to a vendor for fulfillment of the needed quantity. In this way, the payment service automates inventory replenishment and dynamically determines inventory thresholds based on various factors.

In some instances, the payment system may provide further services with respect to inventory replenishment. For example, the payment system may use information about a variety of vendors with which merchants have relationships. The payment system may analyze vendor information, such as item prices, delivery timeliness, distances from the vendors to physical locations of the merchants, etc. Using this information, the payment service may dynamically select vendors on behalf of merchants to fulfill orders, or recommend vendors to the merchants to fulfill orders.

The techniques described herein improve the functioning of computing devices in various ways. For instance, the techniques described herein enable computing devices of a payment service to intelligently automate various functions or services that were previously not performable by prior computing devices. The unique services provided by, and the placement of, the payment service with entities such as merchants, vendors, employees, etc., allows for the collection of information previously unobtainable by merchants. Further, the specific set of rules implemented herein harness this information and the relationships with the merchants to enable computing devices to perform activities previously not performable by computing devices. For instance, intelligently automating the rebalancing of items and replenishment of items was previously not performable by prior computing devices and provides an optimized distributed system of information between the point-of-sale, payment processing, inventory, and employee management systems. Moreover, because merchants lacked the information that the payment service has access to with respect to other merchants, the techniques and rules described herein improve upon prior inventory management techniques previously performed manually by merchants.

The techniques described herein improve upon prior inventory reallocation methods in various ways. Prior art techniques require that merchants manually track inventories at locations, and manually determine whether to move items between locations. However, this manual tracking is slow, time-consuming, and cumbersome. Further, many advantages achieved from inventory reallocation are time sensitive (e.g., change in weather, rapid change in rate of sale, increases sales due to events, etc.) such that manual techniques do not respond quick enough to take advantage of these reallocation advantages. In some examples, the techniques descried herein enable the payment service to intelligently determine minimum and maximum thresholds for items based on various information collected, such as rates of sale for other merchants proximate to a target location of a merchant, sale prices for the other merchants proximate to the merchant, inventory thresholds for the other merchants proximate to the merchant, etc. Further, the payment service is able to harness other types of data, such as event data, historical transaction data, holiday data, weather data, etc., to determine and/or adjust the minimum and maximum sales for a location. In this way, the payment service is able to determine quantities of items to reallocate between locations using rules and information which improve upon prior art techniques. Even further, the techniques described herein allows merchants to more intelligently determine how to transport items between locations. For instance, the payment service may analyze employee work shifts to determine an employee working at two locations who can perform the transfer. Thus, the techniques described herein improve upon the capabilities of computing devices and the capabilities of merchants, and improve upon prior art methods for inventory reallocation and replenishment.

FIG. 1 illustrates an example environment 100 that includes one or more merchants 102 conducting transactions with one or more customers 104 for one or more items 106 (e.g., goods and services), as well as a payment service 108 to authorize one or more payment instruments 110 of the customers 104 for the transactions. The example environment 100 illustrates interactions between the merchants 102, customers 104, and payment service 108 for collecting various data, monitoring item inventories for physical locations 112 (e.g., physical locations 112A, physical locations 112B, etc.), and performing automated rebalancing between the physical locations 112, and automated replenishment for the physical locations 112.

In some examples, the payment service 108 may perform or offer various services through which the payment service 108 obtains data associated with merchants 102, employees 114 of the merchants 102, vendors 116 of the merchants 102, and other types of data. For instance, the payment service 108 may perform transactions between the merchants 102 and customers 104 of the merchants 102. The transactions performed on behalf of the merchants 102 may be initiated at or by one or more merchant devices 118. As used in herein, merchant devices 118 may comprise any sort of mobile or non-mobile devices (e.g., electronic devices) that include instances of application(s) that execute on the respective merchant devices 118. The application(s) may provide POS functionality to the merchant devices 118 to enable merchants 102 (e.g., owners, employees, etc.) to at least accept payments from the customers 104. In some types of businesses, the merchant devices 118 may correspond to a store or other place of business of the merchants, and thus, may be a fixed location that typically does not change on a day-to-day basis. In other types of businesses, however, the location of the merchant devices 118 may change from time to time, such as in the case that the merchants 102 operate a food truck, is a street vendor, is a cab driver, etc., or has an otherwise mobile business, e.g., in the case the merchants 102 sell items at buyer's homes, places of business, and so forth. In either of the examples above, the place of business of the merchants 102 may be referred to as a merchant location or a physical location 112. It should be noted that, in some instances, the merchants 102 may be conducting transaction with customers 104 outside of physical locations 112. For instance, the customers 104 may be using respective electronic devices to purchase items/service(s) 106 from merchants 102 via e-commerce businesses associated with the merchants 102.

Additionally, as used herein, a merchant 102 (also referred to as an "entity") may include any business engaged in the offering of items (e.g., goods) or services for acquisition by customers 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition or obtaining of items and/or services that is conducted between customers 104 and merchants 102. For example, when paying for a transaction, the customer 104 can provide the amount that is due to the merchant 102 using cash or other payment instrument 110 (e.g., a debit card, a credit card, a stored-value or gift card, a check, through an electronic payment application on a device carried by the customer 104, or the like). The merchant 102 can interact with the merchant devices 118 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the device when the card is "dipped" into the reader, a radiofrequency identification tag, or so forth.

In various examples, the merchant devices 118 may send transaction information and employee information to the payment service 108 over one or more networks 120. In some examples, the transaction information may generally represent details involving a payment transaction between the merchants 102 and customers 104.

During a transaction between a merchant 102 and a customer 104, the merchant devices 118 can determine the transaction information describing the transaction, such as the payment information of the payment instrument 110, an amount of payment received from the customer 104, the items/service(s) 106 acquired by the customer 104, a time, place and date of the transaction, a card network associated with the payment instrument 110, an issuing bank of the payment instrument 110, a name of the customer 104, a name or other identifier for an employee 114 who interacted with a customers 104 for a particular transaction, indications of tip amounts for the purchase transactions, and so forth. The merchant devices 118 can send the transaction information 116 to the payment service 108 over the networks 120, either substantially contemporaneously with the conducting of the transaction (in the case of online transactions) or later when the device is in the online mode (in the case offline transactions).

In various examples, the merchant devices 118 may send employee information associated with their employees to the payment service 108. For example, the merchant devices 118 may send in a batch process, continuously, or at regularly scheduled intervals, employee information including an identity of their employees 114, what hours their employees 114 work, what shifts their employees 114 work or are scheduled to work, which physical locations 112 of the merchants 102 the employees 114 work at for their shifts, which transactions individual employees processed (and thus which customers 104 the employees 114 interacted with), and other data associated with employees 114 to the payment service 108. The merchant devices 118 may send the employee information over the networks 120 to the payment service 108.

The payment service 108 may include one or more processors 122 and memory 124, which may store an operating system 126, a payment processing module 128, a replenishment module 130, a rebalancing module 132, and databases 134. The payment processing module 128 may function to receive the transaction information regarding the transaction from the merchant devices 118 and attempt to authorize the payment instrument 110 used to conduct the transaction. The payment processing module 128 may then send an indication of whether the payment instrument 110 has been approved or declined back to the merchant devices 118.

Generally, when a merchant 102 and a customer 104 enter an electronic payment transaction, the transaction is processed by electronically transferring funds from a financial account associated with the customer 104 to a financial account associated with the merchant 102. As such, the payment processing module 128 may communicate with one or more computing devices of a card network (or "card payment network") 136, e.g., MasterCard®, VISA®, over the network 120 to conduct financial transactions electronically. The payment processing module 128 can also communicate with one or more computing devices of one or more banks 138, processing/acquiring services, or the like over the network 120. For example, the payment processing module 128 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instruments 110 to customers 104, and may pay acquiring banks for purchases made by customers 104 to which the issuing bank has issued the payment instruments 110. Accordingly, in some examples, the computing devices of an acquiring bank may be included in the card payment network and may communicate with the computing devices of a card-issuing bank to obtain payment. Further, in some examples, a customer 104 may use a debit card instead of a credit card, in which case, the bank computing devices of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the payment service 108 may receive various types of data from the merchant devices 118 and store the data in the databases 134. The databases 134 may be stored at one location, or across different physical locations and comprise any number of databases. The payment service 108 may receive the transaction information from the merchants 118 and store it in one or more merchant databases 140. The transaction information may comprise any type of information collected during transactions between merchants 102 and customers 104, including, but not limited to, the payment information of the payment instrument 110, an amount of payment received from the customer 104, the items/service(s) 106 acquired by the customer 104, a time, place and date of the transaction, a card network associated with the payment instrument 110, an issuing bank of the payment instrument 110, a name of the customer 104, a name or other identifier for an employee 114 who interacted with a customers 104 for a particular transaction, indications of tip amounts for the purchase transactions, and so forth. The transaction information may be stored in the merchant databases 140 with indications of which merchants 102 performed the transactions.

In some examples, the payment service 108 may further receive the employee information from the merchants 102. The employee information may generally comprise any type of information associated with employees 114 of the merchants 102, such as who their employees 114 are, what hours their employees 114 work, what shifts their employees 114 work or are scheduled to work (e.g., shift schedule), which physical locations 112 of the merchants 102 the employees 114 work at for their shifts, which transactions individual employees processed (and thus which customers 104 the employees interacted with), and other data associated with employees 114. The payment service 108 may then store the employee information in one or more employment databases 142. The payment service 108 may further store indications of merchants 118 that employ the employees.

Rebalancing Techniques

In various examples, the payment service 108 may perform various functions for rebalancing item inventory between two locations of a merchants 102, such as physical location 112A and physical location 112B. While illustrated as being two physical locations 112, the techniques may be equally applied to any number of physical locations 112. As noted above, the merchant devices 118A and 118B may perform transactions with customers 104 on behalf of the merchant 102. Each of the merchant devices 118A and 118B may comprise POS devices which have a POS application executing thereon. The POS applications may receive, via the merchant devices 118, a plurality of payment data from various customers 104 to perform transactions at each of the physical locations 112A and 112B. The POS applications may further cause the merchant devices 118 to send transaction data, including the payment data and an indication of items exchanged, to the payment service 108. The payment service 108 stores the transaction data in the merchant databases 140, and further updates indications of item inventories for the merchants 102 in one or more inventory databases 144. In some examples, the payment service 108 may track, or otherwise obtain, inventory information for items the merchants 102 have in their respective physical locations 112. When the payment service 108 receives transaction data from POS devices 112, it may update the item inventory indications in the inventory database 144.

In some examples, the rebalancing module 132 may perform various operations using the inventory database 144. In some examples, the rebalancing module 132 may analyze the inventory database 144 and/or the transaction information in the merchant databases 140 and determine, for the physical locations 112A and 112B, rates of sales for items 106 sold at the locations. In some examples, the rebalancing module 132 may determine that the physical location 112A sells a particular item at a higher rate of sale than the physical location 112B. In some examples, the rebalancing module 132 may determine, based at least in part on the rates of sales of the item for the physical locations 112A and 112B, to generate a transfer order that instructs the physical location 112B to send a particular quantity of the item 106 to the physical location 112A.

In some examples, the rebalancing module 132 may perform various operations for determining the particular quantity of the item to be transferred between the physical locations 112A and 112B. For instance, the rebalancing module 132 may predict that in the future (e.g., one day, one week, one month, etc.), the rate at which the item is selling at the physical location 112A may increase to a higher rate. For example, the rebalancing module 132 may analyze one or more models 146, such as a calendar model indicating events associated with the physical location 112A. As an example, the merchant 102 may be having a semiannual sale for the item 106 at the physical location 112A in the near future, which may result in an increased rate of sale for the item 106 which requires additional inventory. Additionally, the rebalancing module 132 may analyze a weather model of the models 146 to identify a weather pattern associated with physical location 112A which results in an increase in sales for the item 106. For instance, the rebalancing module 132 may determine that a heat wave is expected for an area corresponding to the physical location 112A, and that an item 106 such as sunscreen will sell at a higher rate. As another example, the rebalancing module 132 may analyze a holiday model of the models 146 to determine a holiday approaching. For example, the physical location 112A may be located in New Orleans, and the merchant 102 may require an increased amount of bead necklaces for the physical location 112A upon determining that Mardi Gras is approaching. Based on analyzing the various models 146, the rebalancing module 132 may calculate the particular quantity of the item 106 to be transferred. In some examples, the models 146 may indicate historical trends at which the items 106 sold for similar types of events (e.g., weather patterns, holidays, etc.), and use those trends to determine the particular quantity of the item 106.

In further examples, the rebalancing module 132 may analyze inventories of other merchants 102 at locations within a threshold proximity (e.g., 1 mile, 5 miles, the same city, etc.) to the physical location 112A to determine the inventory of the same item or similar item at those other merchant's 102 physical locations 112. Based on the other merchant's 102 inventories, the rebalancing module 132 may calculate the particular quantity of the item 106. For instance, the rebalancing module 132 may determine rates of sales for the other merchants 102, and the inventories of the items 106 of the other merchants 102, and calculate the particular quantity of the item that the merchant 102 needs at the physical location 112A based on the rates of sales and inventories of the other merchants 102.

In various examples, the merchant 102 may indicate that the physical location 112A is a new location that the merchant 102 is opening. Thus, the merchant 102 may not have collected any data for the payment service 108 to use to determine a rate of sale at the new physical location 112A. In such examples, the rebalancing module 132 may determine rates of sales for other merchants within a threshold proximity to the merchant's 102 new physical location 112A for the same item 106, or similar items, and use those rates of sale to approximate what a predicted rate of sale for the merchant 102 will be at the physical location 112A. The rebalancing module 132 may then determine the particular quantity of the item 106 to transfer from the physical location 112B to the new physical location 112A based on the approximated expected rate of sale.

In various examples, the rebalancing module 132 may determine various triggers which indicate that the particular quantity of the item 106 should be transferred from the physical location 112B to physical location 112A. For example, the rebalancing module 132 may determine an amount of time until the items 106 expire at the physical location 112B. If the items 106 are likely to expire at the physical location 112B before the items are sold based on a rate of sale at the physical location 112B, the rebalancing module 132 may determine to send the particular quantity of the items 106 to the physical location 112A which has the higher rate of sale to prevent the items 106 from expiring before being sold.

In some examples, the rebalancing module 132 may analyze the inventory database 144 to determine that another merchant 102 is sending a particular quantity of the item, or a similar item, from one of their physical locations 112 to another one of their physical locations 112 proximate the physical location 112A. The rebalancing module 132 may determine to send the particular quantity of the item from physical location 112B to physical location 112A based on determining that the other merchant is sending a quantity of the item or similar item to the location proximate the physical location 112A.

In various examples, other triggers may be used to determine to transfer the particular quantity of the item 106 from the physical location 112B to the physical location 112A. For example, a competitor within a threshold distance from the physical location 112A may have closed, which may indicate that the rate of sale of the item 106 at the physical location 112A will increase. In another example, various media outlets, such as social media, may indicate that the item 106 is trending at the physical location 112A. Based on the trending of the item 106 near the physical location 112A, the rebalancing module 132 may determine to initiate the transfer of the items from the physical location 112B to the physical location 112A.

In some instances, the rebalancing module 132 may determine, based on the inventory databases 144, that a transaction for the particular item 106 occurred at the physical location 112A based on receipt of transaction data received from the merchant device 118A. The sale of the particular item 106 may cause the quantity of the item 106 at the physical location 112A to drop below a minimum predefined inventory threshold that the merchant 102 should have at the physical location 112A. The rebalancing module 132 may determine to generate the transfer order based on determining that the quantity of the item 106 at the physical location 112A has dropped below the minimum predefined inventory threshold. In some examples, the rebalancing module 132 may analyze the inventory databases 144 at predefined intervals (e.g., one day, one week, etc.) to determine whether inventories for items 106 have fallen below the minimum predefined inventory threshold.

In various examples, upon determining to transfer the particular quantity of the item 106, the rebalancing module 132 may further analyze the inventory database 144 and/or the merchant database 140 to determine other items 106 to be transferred from the physical location 112B to the physical location 112A. As an example, if the rebalancing module 132 determines that a particular quantity of sunscreen should be transferred from the physical location 112B to the physical location 112A, then item commonly sold with sunscreen may also be transferred. For example, if customers 104 often buy bottled water or sunburn ointment with sunscreen, then the rebalancing module 132 may further determine to send a particular quantity of bottled water or sunburn ointment along with the particular quantity of the sunscreen.

In various examples, the rebalancing module 132 may determine to send the particular quantity of the item 106 from the physical location 112B to the physical location 112A based on a price of the item 106 at the different physical locations 112. For instance, the rebalancing module 132 may analyze the inventory database 144 and determine that the merchant 102 at physical location 112A, or other merchants proximate to physical location 112A, are selling the item 106 at a higher price than at physical location 112B, and determine to transfer the particular quantity of the item based on the higher price at physical location 112A. In some instances, the rebalancing module 132 may further determine a cost associated with transporting the particular item 106. For example, if a refrigerated vehicle is required to transport the item 106 between the physical locations 112, the rebalancing module 132 may determine whether the increased profit margin for the higher price of the item 106 at physical location 112A is worth the cost of transportation. Further, the rebalancing module 132 may determine how many of the item 106 would need to be transferred to realize a profit from the higher price despite the cost of transportation of the item 106 between physical location 112B and physical location 112A.

Once the rebalancing module 132 has determined to transfer the item 106 from the physical location 112B to the physical location 112A, and the particular quantity of the item 106 to be transfer, the rebalancing module 132 may generate a transfer order and send the transfer order to the merchant device 118B at the physical location 112B to initiate the transfer of the particular quantity of the item from the physical location 112B to the physical location 112A. The transfer order may be presented on a display of the merchant device 118B to initiate transfer of the item 106. In some examples, the transfer order may further indicate a reason why the transfer of the item 106 is being ordered or recommended (e.g., higher rate of sale, future event, expiration date of the items, etc.).

In some examples, the rebalancing module 132 may further analyze the employment database 128 to determine an employee 114 to transfer the particular quantity of the item 106 from the physical location 112B to the physical location 112A. For example, the rebalancing module 132 may determine, based on a shift schedule of the employee 114 stored in the employment database 142, that the employee 114 is scheduled to work a swing shift between the two physical locations 112B and 112A, or otherwise work two shifts within close enough temporal proximity, that the employee 114 may transfer the items 106 on behalf of the merchant 102. For instance, the employee 114 may work the first part of the swing shift at the physical location 112B, and then transport the items 106 to the physical location 112A for the second part of the swing shift. In various examples, the transfer order may include a recommendation to have the employee 114 perform the transfer of the particular quantity of the item 106.

In other examples, the rebalancing module 132 may determine that the merchant 102 has an already scheduled transfer of items 106 using a courier service from the physical location 112B to the physical location 112A in the near future and include the particular quantity of the item 106 in delivery to be performed by the courier service.

In various examples, the transfer order may be presented on an interface of the merchant device 118B which allows for the merchant 102 and/or employee 114 to provide feedback to the payment service 108. For example, the user interface on the merchant device 118B may receive various input from the merchant 102 and/or employee 114. The user interface may receive input indicating that the transfer order has been issued, and the merchant device 118B may send a status update to the payment service 108 that the transfer order has been issued. Further, the user interface may receive user input indicating that the transfer order is in process (e.g., the items 106 have left the physical locations 112B, and the merchant device 118B may send a status update to the payment service 108 indicating that the transfer of the items 106 is in process).

In various examples, once the employee 114 or courier service has transferred the particular quantity of the item 106 from the physical location 112B to the physical location 112A, the merchant 102 or employee 114 may provide user input into a user interface of the merchant device 118A indicating that the transfer has been completed, and the merchant device 118A may send an indication that the transfer has been competed to the payment service. Upon receiving this indication, the rebalancing module 132 may update the inventory database 144 to reflect the particular quantity of the item 106 being transferred from the inventory of the physical location 112B to the physical location 112A.

In some examples, the rebalancing module 132 may employ various machine learning models or algorithms to further train and learn from the rebalancing of items 106. For example, the rebalancing module 132 may use machine learning to analyze various attributes for the rates of sale of the item 106 at the physical location 112A, such as a geographical area (e.g., neighborhood, city, state, etc.) associated with the physical location 112A, a type of the merchant (e.g., outdoor recreational gear, restaurant, clothing, etc.), an item type of the item (e.g., food, clothing, etc.), a price of the item 106, or other attributes associated with the rates of sale of the item 106 at the physical location 112A.

The rebalancing module 132 may store a correlation between the rates of sale and the attributes. In some examples, the merchant 102 may send feedback to the payment service 108 indicating whether or not the transferred items were sold at the physical locations 112A at, or near, the rate of sale. If the items were sold at the higher rate of sale at the physical locations 112A, then the rebalancing module 132 may determine a confidence value associated with the correlation between the first rate of sale and the attributes of the rate of sale of the item 106 at the physical location 112A. For example, if the items 106 do sell at a higher rate at the physical location 112A, then the rebalancing module 132 may determine that the various attributes of the physical location 112A and/or the item 106 may have a better predictability as to rates of sale when items are transferred. In this way, the rebalancing module 132 may determine which attributes are more or less indicative that an item 106 will sell well, and should be transferred between physical locations 112.

As noted above, the rebalancing module 132 may determine a predicted rate of sale for the item 106 based on various factors, such as rates of sale for the item 106 by other merchants at their physical locations 112 near physical location 112A. The payment service 108 may receive an indication from a merchant device 118 indicating a rate of sale that the particular quantity of the item 106 ended up selling at physical location 112A. If the rebalancing module 132 determines that the actual rate of sale of the item 106 at the physical location 112A is within a threshold error margin (e.g., 2%, 5%, 10%, etc.) to the predicted rate of sale, the rebalancing module 132 may increase a confidence value associated with the correlation value between the predicted rate of sale and the attributes of the item 106 and the merchant 102.

Replenishment Techniques

In various examples, the payment service 108 may perform various functions for replenishing item inventory for physical locations 112 of a merchants 102. As noted above, the payment service 108 may perform transactions on behalf of the merchants 102. The payment service 108 further stores information about the transactions in the merchant database 140, and further updates indications of item inventories for the merchants 102 in the inventory database 144. In some examples, a replenishment module 130 may monitor the inventory database 144 to track inventories of items at the physical locations 112 of the merchants 102. Thus, rather than the merchants 102 having to manually monitor their inventories of items 106 at their physical locations 112, the payment service 108 may monitor the inventories on behalf of the merchants 102, and the replenishment module 130 may perform intelligent replenishment of items 106 for the inventories of the physical locations 112 of the merchants 102.

In various instances, when the replenishment module 130 determines that an item inventory for an item 106 at physical locations 112 of merchants 102 has fallen below, or is approaching, a minimum quantity of items 106 that the merchant 102 should have at a physical location 112. For instance, the replenishment module 130 may track sales of the item 106 via the merchant database 140 and/or inventory database 144, and determine whether the item 106 quantity at a physical location 112 is approaching, or below, the minimum quantity of the item. In such examples, the replenishment module 130 may determine to generate an order for more of the item 106. In various examples, the replenishment module 130 may determine a needed quantity of the item 106 when the item inventory is below or approaching the minimum quantity of items for the physical location 112. For example, the replenishment module 130 may calculate a difference between the current quantity of the item, and the maximum quantity of the item, and determine the needed quantity of the item 106 is that difference. In other examples, the replenishment module 130 may not order items 106 up to the maximum quantity of the item 106. The replenishment module 130 may store indications of the minimum and maximum thresholds for the items 106 for each of the merchants 102 in the inventory database 144.

In some examples, the replenishment module 130 may determine whether another order has already been placed for the item 106 on behalf of the merchant 104. If another order has been placed and/or is in transit, the replenishment module 130 may determine to adjust the needed quantity based on the quantity of the item 106 in the other order.

In some examples, the replenishment module 130 may determine threshold quantities of items 106 that the merchants 102 should maintain, or refrain from exceeding, at their respective locations 112. For example, the replenishment module 130 may determine a minimum quantity of an item 106 that a merchant 102 should have in an item inventory of a physical location 112A, and a maximum quantity of the item 106 that the merchant 102 should have in the item inventory of the physical location 112A. In some examples, the replenishment module 130 may simply receive input from a merchant 102 indicating the minimum and maximum quantities or thresholds of the items 102, such as via the merchant device 118A. In other examples, the replenishment module 130 may determine the minimum and maximum dynamically using various types of data available to the payment service 108. For example, the replenishment module 130 may determine rates of sale for items 106 at the physical location 112A, and determine based on how fast the items 106 are selling, the minimum quantity of the item 106 and the maximum quantity of the item 106 the merchant 102 should have a physical location 112. The minimum and maximum quantity thresholds may further be based on other factors, such as how frequently the merchant 102 orders items 106, expirations dates of the items 106, available capital of the merchant 102, etc. In various examples, the replenishment module 130 may determine the minimum and maximum quantities of the items 106 for a physical location 112A based on data of other merchants 102 who sell the item 106, or a similar item 106, at physical locations 112 near the physical location 112A. This may be particularly helpful for merchants 102 who are putting in a new physical location 112A to sell the item in an area they are unaware of how well the item 106 will sell. For instance, the replenishment module 130 may look at minimum and maximum thresholds for the other merchants 102, rates of sale for the other merchants 102, or other data. In some examples, if the merchant 102 has just begun selling the item 106 at the particular location 112A, the replenishment module 130 may determine minimum and maximum thresholds based on the thresholds for other similar items the merchant 102 sells at that location.

In various examples, the replenishment module 130 may dynamically adjust or modify the maximum or minimum thresholds for items 106 at the physical locations 112 of the merchants 102. The replenishment module 130 may analyze the models 146 to determine to increase or decrease the maximum and minimum thresholds for items that the merchant 102 has at their physical locations 112. For instance, the replenishment module 130 may analyze a holiday model, a calendar model, and/or an event model of the models 146 to determine whether to increase or decrease the minimum and maximum thresholds for the items 106 at the physical locations 112. Similar to the techniques performed by the rebalancing module 132, the replenishment module 130 may determine whether particular holidays or events are approaching where a rate of sale of the item 106 increases, and determine that the minimum and maximum thresholds for the items 106 should be increased for those holidays or events. As another example, the replenishment module 130 may determine that a weather pattern is approaching which may result in a rate of sale of an item 106 decreasing (e.g., summer is coming and jackets do not sell as well). The replenishment module 130 may determine to lower the minimum and maximum thresholds for the item inventories at the locations 112 based on analyzing these models 146.

In some examples, the replenishment module 130 may determine to increase or decrease the minimum or maximum thresholds based on expiration dates of the items. For example, perishable goods may have the respective item thresholds decreased to prevent the items from expiring and/or going bad. Conversely, items 106 with a long shelf life may have their minimum and/or maximum thresholds increased. In some examples, the minimum and/or maximum thresholds for item inventories at the physical locations 112 may be decreased based on competing merchants 102 opening new locations nearby physical location 112A, or increased based on other merchants 102 closing physical locations 112 nearby physical location 112A. The replenishment module 130 may determine whether or not merchants 102 are opening or closing locations based on analyzing the merchant databases 140. In various examples, the replenishment module 130 may determine to increase the minimum or maximum item thresholds if the rate of sale of the item 106 has increased over time, and decrease the minimum or maximum item thresholds if the rate of sale of the item 106 has decreased over time.

In various examples, rather than automatically adjusting the minimum and maximum thresholds for items 106 at a physical location 112 of a merchant, the replenishment module 130 may instead send a recommendation to a merchant device 118 of the merchant 112 to adjust the thresholds, and receive feedback regarding whether or not the replenishment module 130 should adjust the thresholds.

As noted above, the replenishment module 130 may determine whether items 106 at a physical location 112 of a merchant are approaching or have fallen below a minimum quantity of item threshold for the physical location 112. In various examples, the replenishment module 130 may periodically (e.g., daily, weekly, etc.) analyze the inventory database 144 to determine whether the current quantity of the item 106 is approaching or has fallen below the minimum quantity threshold. In various examples, the replenishment module 130 may determine that the current quantity of the item 106 is approaching or below the minimum quantity threshold in response to performing a transaction for the sale of the item 106 which drops the current quantity of the item.

The replenishment module 130 may determine a current quantity of the item 106 at the physical location, and based on the maximum quantity thresholds, determine a needed quantity of the item. The replenishment module 130 may then generate an order for the needed quantity of the item. In some examples, the replenishment module 130 may automatically generate the order without input from the merchant 102 to automate the process. In some examples, automatically generating the order may include gendering the order for the item without user input and by the replenishment module 130. In other examples, the replenishment module 130 may send the order to the merchant 102 for approval. Once the order is generated, the replenishment module 130 may send the order to a vendor 116 for fulfillment of the needed quantity of the item 106. In various examples, the vendor 116 may require that an order for an item 106 be over a threshold amount to accept the order. If the needed quantity of the item 106 is not over the threshold amount, the replenishment module 130 may determine that other merchants 102 also need the item 106, and perform a batch order for the item 106 from the vendor 116 to fulfill the vendor's 116 threshold requirement. The replenishment module 130 may then cause the batch order to be distributed to the merchants 102 appropriately.

In some examples, the replenishment module 130 may determine to extend capital to the merchant 102 to purchase the needed quantity of the item 106. The replenishment module 130 may determine a value associated with the merchant 102 and/or the item (e.g., a health of the merchant's business). For example, the replenishment module 130 may determine information such as a current rate of sale at which the merchant 102 is selling the item 106, a price at which the merchant 102 is selling the item 106, a historical seasonal sale rate for the item 106, wherein the historical seasonal sale rate is associated with a current season or a next season for the physical location, or an event sale rate for the item indicating a rate at which the merchant sales the item for a future event or holiday. The replenishment module 130 may determine, based on the value associated with the merchant 102 selling the item 106, to provide at least a portion of the capital required to buy the needed quantity of the item 106 on behalf of the merchant 102. For instance, if the price, rate of sale, seasonal rate, etc., are all relatively high, the replenishment module 130 may determine to front some of the capital for the purchase as the payment service 108 is confident they will be able to recoup their investment.

In some examples, the replenishment module 130 may determine, based on the inventory database 144, that another merchant 102 has extra inventory of the item 106. The replenishment module 130 may ask the other merchant 102 if they would be willing to sell the extra inventory. For instance, the extra inventory may be likely to expire, and the other merchant 102 may be willing to sell the extra inventory at a discounted rate. In such examples, the replenishment module 130 may send a notification to the merchant 102 that the other merchant 102 is willing to sell extra inventory at the discounted rate, and the replenishment module 130 may facilitate the purchase between the merchants 102.

In various examples, the replenishment module 130 may intelligently determine and/or change vendors 116 supplying the items 106 to the merchants 102. For instance, the replenishment module 130 may analyze the vendor database 148 to identify information for each of the vendors 116 used by the various merchants 102 which use the payment service 108. The information for each vendor 116 may include, for example, prices at which the vendors 116 provide the item 106 to merchants 102, vendor 116 locations from which the vendors 116 supply the item to the merchants, and/or average periods of time from when orders are placed for or by the merchants 102 and fulfilled by the vendors 116 (e.g., delivered). In some examples, the replenishment module 130 may select a vendor 116 to send the order for the needed quantity of the item 106 which has the most favorable prices, the closest locations to the physical locations 112 of the merchants 102, and/or the faster period of time to fulfill the orders. In various examples, the replenishment module 130 may determine to switch vendors 116 based on this information. The replenishment module 130 may automatically switch vendors 116 on behalf of the merchant, or send a recommendation to a merchant device 118 to switch vendors with the information indicating why the merchant 102 should switch vendors 116.

In some examples, the rebalancing module 132 may determine times at which to send the order to the vendor 116. For instance, the rebalancing module 132 may identify a date by which the merchant 102 expects or must receive the needed quantity of the item 106, and determine, based on historical delivery time data associated with the vendor 116 stored in the vendor database 148, an expected time for the vendor 116 to deliver the needed quantity of the item 106. The rebalancing module 132 may then determine a time at which to send the order to the vendor for fulfillment of the needed quantity of the item based at least in part on the expected time and the time that the merchant 102 needs the items 106.

In the example of FIG. 1, the payment service 108 further includes one or more network interfaces 150 for communicating over the networks 120. The network interface(s) 150, along with any other network interface(s) described herein, may include one or more interfaces and hardware components for enabling communication with various other devices over the network 120 or directly. For example, network interface(s) 150 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

As discussed herein, processor(s), such as processor(s) 122, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 124, may be an example of tangible non-transitory computer storage media and may include volatile and non-volatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices, such as merchant devices, the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Additional functional components of the payment service 108 may include an operating system 126 for controlling and managing various functions of the payment service 108 and for enabling basic user interactions with the payment service 108.

Figure 2:
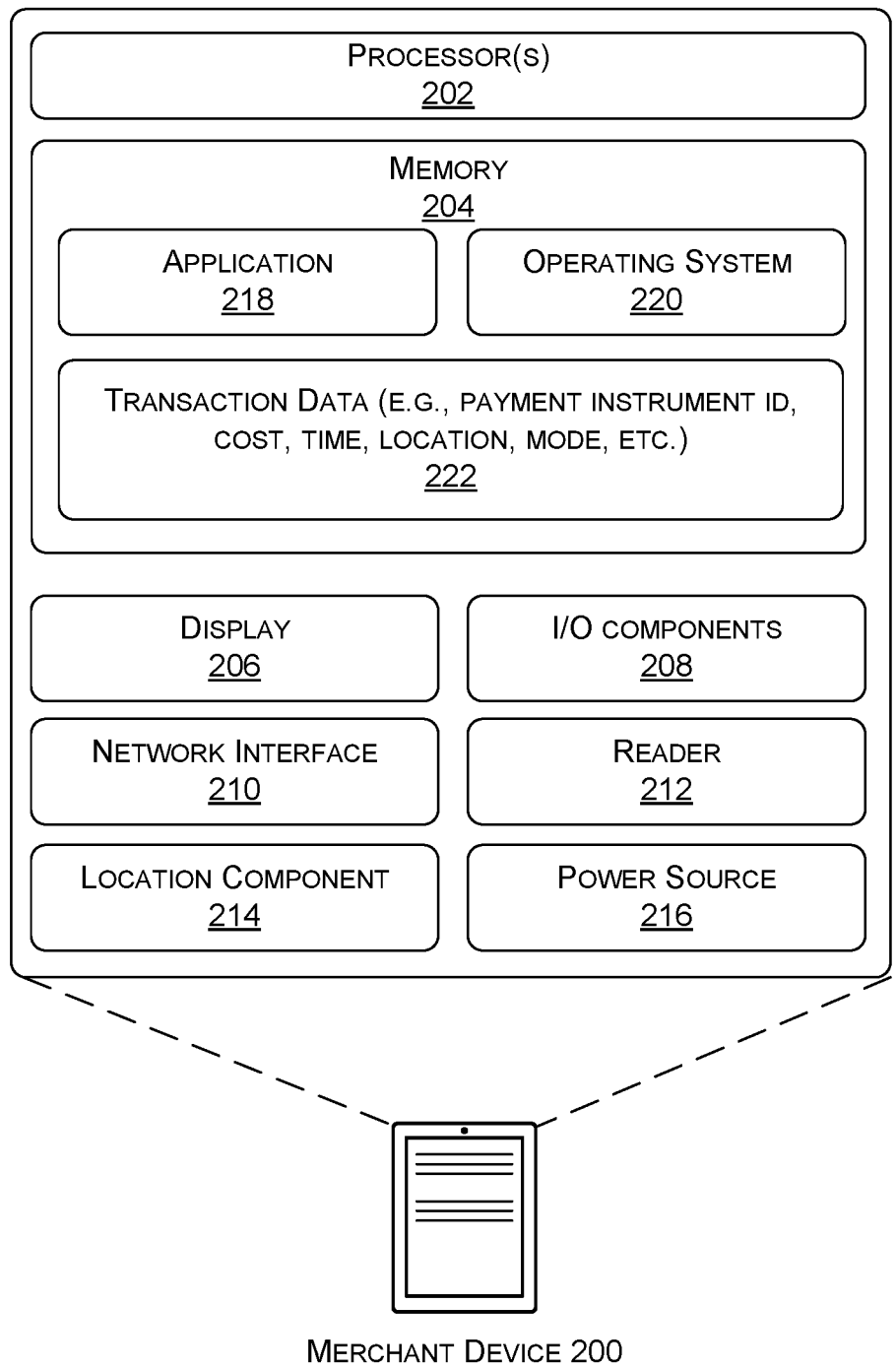
FIG. 2 illustrates components of a merchant device.

FIG. 2 illustrates select example components of an example merchant device 200 according to some implementations. The merchant device 200 may include any of the merchant devices 118 from FIG. 1. The merchant device 200 may be any suitable type of computing device, e.g., mobile, semi-mobile, semi-stationary, or stationary. Some examples of the merchant device 200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 200 includes at least one processor 202, memory 204, a display 206, one or more input/output (I/O) components 208, one or more network interfaces 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 200, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the merchant device 200 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 200.

Functional components of the merchant device 200 stored in the memory 204 may include a merchant application 218, which may interact with applications executing on client devices to allow customers to pay for items offered by the merchant. The merchant application 218 may present an interface on the merchant device 200 to enable the merchant to conduct transactions, receive payments, and so forth, as well as communicating with the payment service for processing payments and sending transaction information. Further, the merchant application 218 may present an interface to enable the merchant to manage the merchant's account, and the like. Finally, the merchant application 218 may send data associated with the merchant, employees, and/or vendors to the payment service 108, and receive transfer orders from the payment service 108.

Additional functional components may include the operating system 220 for controlling and managing various functions of the merchant device 200 and for enabling basic user interactions with the merchant device 200. The memory 204 may also store transaction data 222 that is received based on the merchant associated with the merchant device 200 engaging in various transactions with customers, such as customers 104 from FIG. 1.

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 200, the memory 204 may also optionally include other functional components and data, which may include programs, drivers, etc., and the data used or generated by the functional components. Further, the merchant device 200 may include many other logical, programmatic and physical components, of which those described are merely examples that are related to the discussion herein.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein. In some examples, the network interface(s) 210 may be used to send various information across networks, such as networks 120. For instance, the network interface(s) 210 may send data such as transaction information and/or employee information described with respect to FIG. 1.

FIG. 2 further illustrates that the merchant device 200 may include the display 206 mentioned above. Depending on the type of computing device used as the merchant device 200, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 200 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the POS device uses the printing device to print the physical receipts after receiving data representing the receipts from a payment service.

It should be noted that, in some examples, the I/O components 208 may be separate from the merchant device 200. For instance, the printing device may be separate from the merchant device 200. In some examples, the merchant device 200 sends data representing the receipts to the printing device to cause the printing device to print physical receipts.

In addition, the merchant device 200 may include or may be connectable to a payment instrument reader 212. The payment instrument reader 212 may be communicatively coupled to the merchant device 200, but located exterior the merchant device 200. For instance, the reader 212 may be connected to the merchant device 200 via a wireless network. In some examples, the reader 212 may plug in to a port in the merchant device 200, such as a microphone/headphone port, a data port, or other suitable port. In other instances, the reader 212 is integral with the entire merchant device 200. The reader 212 may include a read head for reading a magnetic strip of a payment card, and further may include encryption technology for encrypting the information read from the magnetic strip. Alternatively, numerous other types of card readers may be employed with the merchant device 200 herein, depending on the type and configuration of a particular merchant device 200.

The location component 214 may include a GPS device able to indicate location information, or the location component 214 may comprise another other location-based sensor. The merchant device 200 may also include one or more additional sensors (not shown), such as an accelerometer, gyroscope, compass, proximity sensor, and the like. Additionally, the merchant device 200 may include various other components that are not shown, examples of which include removable storage, a power control unit, and so forth.

Figure 3:
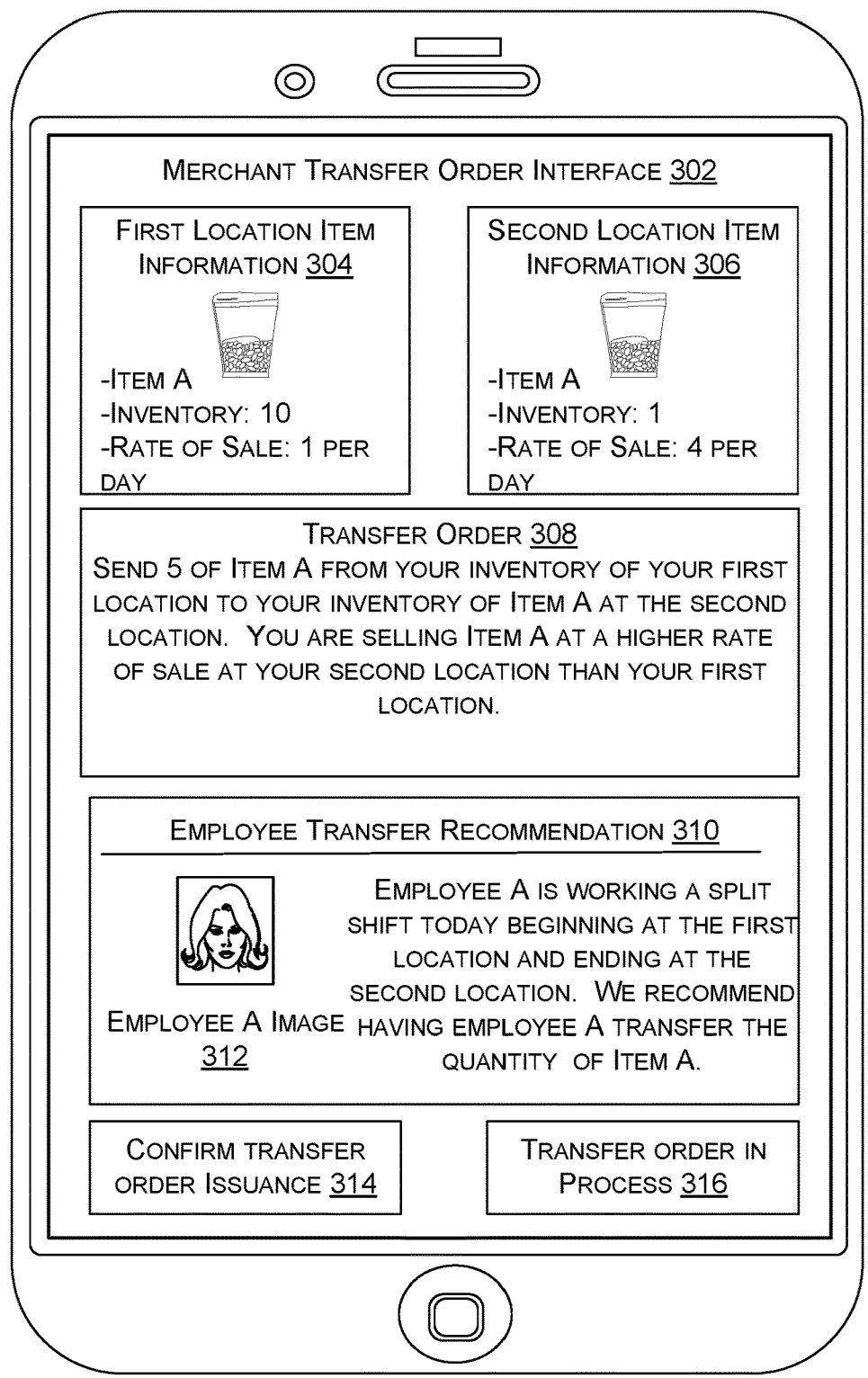
FIG. 3 illustrates an example user interface presented on a merchant device which includes a merchant transfer order interface instructing the merchant to perform a transfer of items between physical locations of the merchant.

FIG. 3 illustrates an example user interface presented on a merchant device 300 (e.g., merchant devices 118) which includes a merchant transfer order interface 302 instructing the merchant 102 to perform a transfer of items 106 between physical locations 112 of the merchant 102. In some examples, the merchant transfer order interface 302 may present a transfer order received from the payment service 108, where the transfer order instructs, or recommends, the merchant 102 to transfer items between physical locations 112.

In some examples, the merchant transfer order interface 302 may include first location item information 304, and second item information 306. Each of the first and second item information 304 and 306 may include information about items being sold at different locations of the merchant 102. For instance, the first location item information 304 may indicate that the inventory of item A is 10 at a first location, and the rate of sale is 1 item per day. Similarly, the second location item information 306 may indicate that the inventory of item A at a second location of the merchant 102 is 1 item and the rate of sale is 4 items per day.

The merchant transfer order interface 302 may further include a transfer order 308 which instructs the merchant 102 to send 5 of item A from the inventory of the first location to the second location because item A is selling at a higher rate at the second location than the first location. In some examples, the transfer order 308 may further include information indicating other reasons to transfer the quantity of item A, such as a higher price at the second location, a future event coming at the second location which will increase the rate of sale further, etc.

The merchant transfer order interface 302 may further include an employee transfer recommendation 310 which indicates an employee 114 who is able to perform the transfer of the item 106 from the first location to the second location. The employee transfer recommendation 310 may include an image of employee A, text indicating that employee A is working a split shift today beginning at the first location and ending at the second location, and a recommendation to have employee A perform the transfer when switching locations.

Further, the merchant transfer order interface 302 may include a confirm transfer order issuance input option 314. In some examples, employee A, or the merchant 102, may select the transfer order issuance input option 314 to indicate that the transfer of item A is being processed. Upon receiving selection of the transfer order issuance input option 314, the merchant device 300 may send an indication to the payment service 108 that the transfer order is issued.

Further, the merchant transfer order interface 302 may include a transfer order in process input option 316. Employee A or the merchant 102 may select this option to indicate the quantity of item A has left the first location and that the transfer is in process. For example, a geolocation of the employee may be communicated to the POS or the payment service directly (via a payment service application installed on Employee A's phone, geofence, wearable device, etc.) so as to indicate that the employee has left the first physical location and is in route to the second physical location. In some examples, responsive to receiving input via the transfer order in process input option 316, the merchant device 300 may send an indication to the payment service 108 that the transfer of the particular quantity of item A is in process (e.g., the particular quantity of item A has left the first location).

Figure 4:
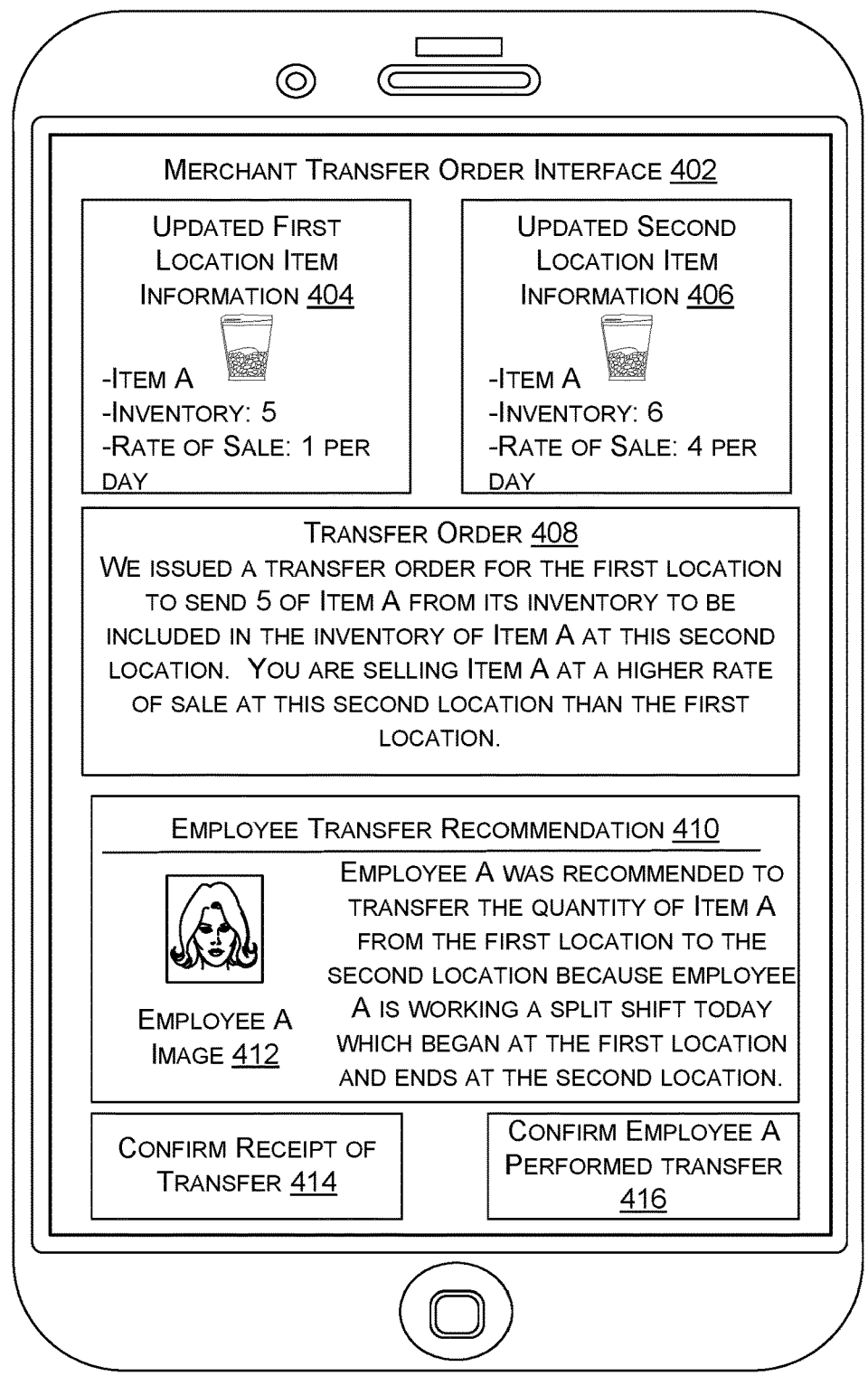
FIG. 4 illustrates an example user interface presented on a merchant device which includes a merchant transfer order interface for a merchant to confirm that a transfer of items between physical locations has occurred.

FIG. 4 illustrates an example user interface presented on a merchant device 400 (e.g., merchant device 118) which includes a merchant transfer order interface 402 for a merchant 102 to confirm that a transfer of items 106 between physical locations 112 has occurred.

In some examples, the merchant transfer order interface 402 may include updated first location item information 404, and updated second item information 406. Each of the updated first and second item information 404 and 406 may include updated information about items being sold at different locations of the merchant 102. For instance, the updated first location item information 404 may now indicate that the inventory of item A has been updated to 5 at the first location after the transfer, and the rate of sale is still 1 item per day. Similarly, the updated second location item information 406 may indicate that the inventory of item A at the second location of the merchant 102 has now been updated to 6 items and the rate of sale is still 4 items per day. Thus, the inventory at each location has been updated to reflect the transfer of the item A.

The merchant transfer order interface 402 may further include a transfer order 408 which informs the merchant 102 and/or an employee 114 at the second location why 5 of item A was transferred from the inventory of the first location to the second location. For instance, the transfer order 408 indicates that the transfer order was issued because item A is selling at a higher rate at the second location than the first location.

The merchant transfer order interface 402 may further include the employee transfer recommendation 410 which indicates the employee A who was instructed to perform the transfer of the item A from the first location to the second location. The employee transfer recommendation 410 may include the image of employee A, text indicating that employee A is now working the second part of the split shift which began at the first location and is now ending at the second location.

Further, the merchant transfer order interface 402 may include a confirm receipt of transfer input option 414. In some examples, employee A, or the merchant 102, may select the confirm receipt of transfer input option 414 to indicate that the transfer of item A was completed and the quantity of item A has arrived at the second location. Upon receiving selection of the confirm receipt of transfer input option 414, the merchant device 400 may send an indication to the payment service 108 that the transfer order is completed, and the inventories have changed. The merchant transfer order interface 402 may further include an option 416 to confirm that employee A performed the transfer.

Figure 5:
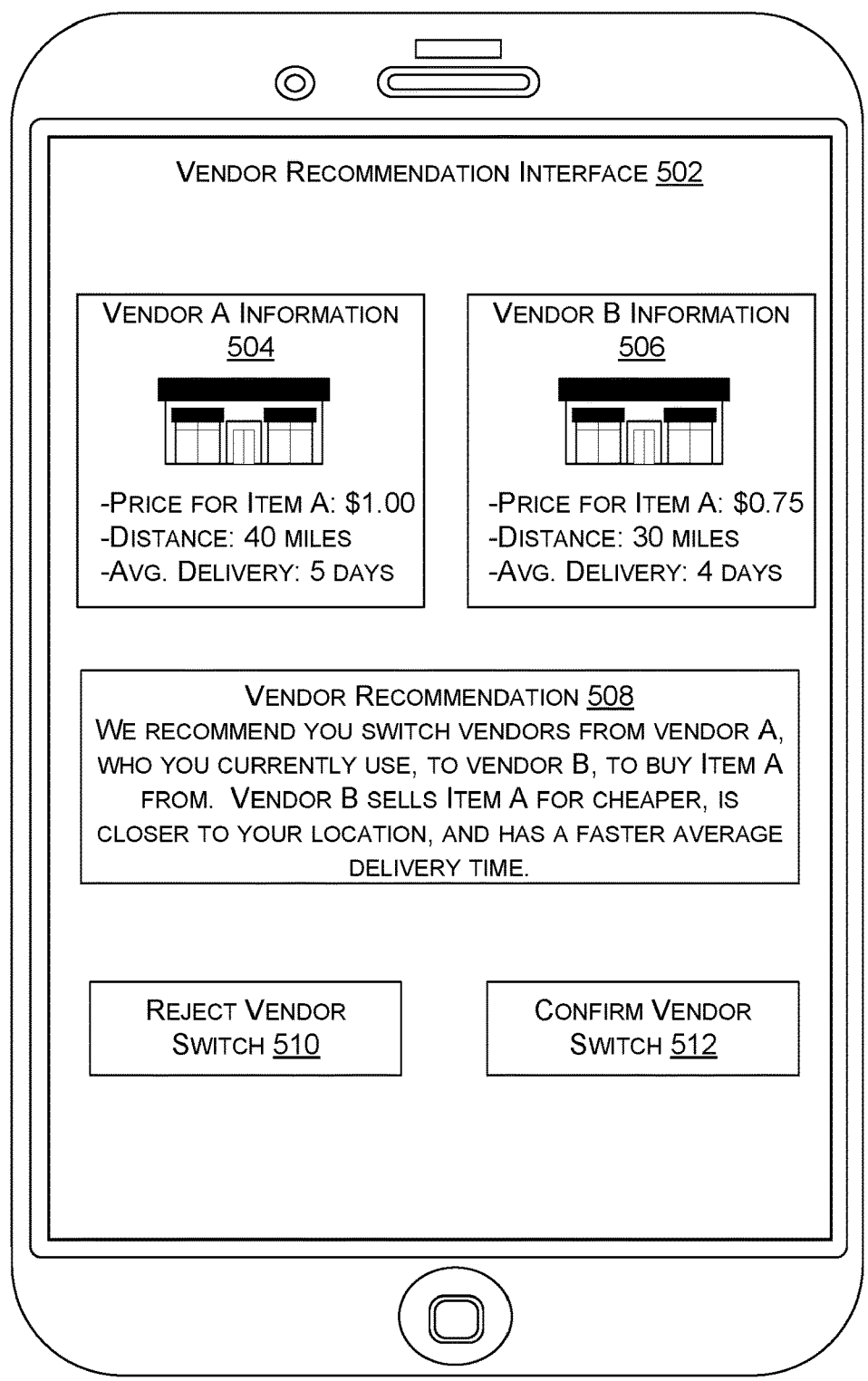
FIG. 5 illustrates an example user interface presented on a merchant device which includes a recommendation for the merchant to switch vendors for purchasing an item.

FIG. 5 illustrates an example user interface presented on a merchant device 500 (e.g., merchant device 118) which includes a vendor recommendation interface 502 for a merchant 102 to switch vendors 116 from a current vendor to a new vendor to purchase an item 106 based on vendor information.

In some examples, the vendor recommendation interface 502 may include vendor A information 504 and vendor B information 506. Vendor A information 504 illustrate information for the current vendor 116 of the merchant 102, such as price for an item A, a distance from vendor A to the merchant's 102 physical location 112, and/or an average delivery time. Vendor B information 506 may indicate information to a vendor 116 that the rebalancing module 132 is recommending to the merchant 102 as a possible replacement vendor 116. Vendor B information 506 similarly illustrates information for the current vendor 116 of the merchant 102, such as price for an item A, a distance from vendor A to the merchant's 102 physical location 112, and/or an average delivery time.

The vendor recommendation interface 502 may further include a vendor recommendation 508 which includes a recommendation that the merchant 102 begin to buy item A from the vendor B, rather than the current vendor A. For instance, the vendor recommendation 508 may indicate that vendor B has various benefits over vendor A, such as better prices, a less distance to travel to deliver the item A to the merchant's 102 physical location 112, and a faster average delivery time.

The vendor recommendation interface 502 further includes a rejection vendor switch option 510 for the merchant to reject the recommended vendor switch. For instance, the merchant 102 may know or be familiar with the vendor A and prefer to keep buying item A from vendor A. Alternatively, the merchant 102 may select a confirm vendor switch option 512 which indicates that the merchant 102 would like to use the vendor A moving forward to fulfill orders for Item A. The merchant device 500 may send an indication to the payment service of which of the options 510 or 512 the merchant selected, and update the vendor information for the merchant 102 upon selection of a confirm vendor switch option 512.

FIGS. 6-11 illustrate flow diagrams of example processes for performing rebalancing and replenishment of items at physical locations of merchants. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all the blocks need be executed. For discussion purposes, the processes are described with reference to the environments, architectures and systems described in the examples herein, although the processes may be implemented in a wide variety of other environments, architectures and systems. The process described herein, may be performed by a payment service, a merchant device, a customer device, an additional electronic device, or by a combination thereof.

Figure 6:
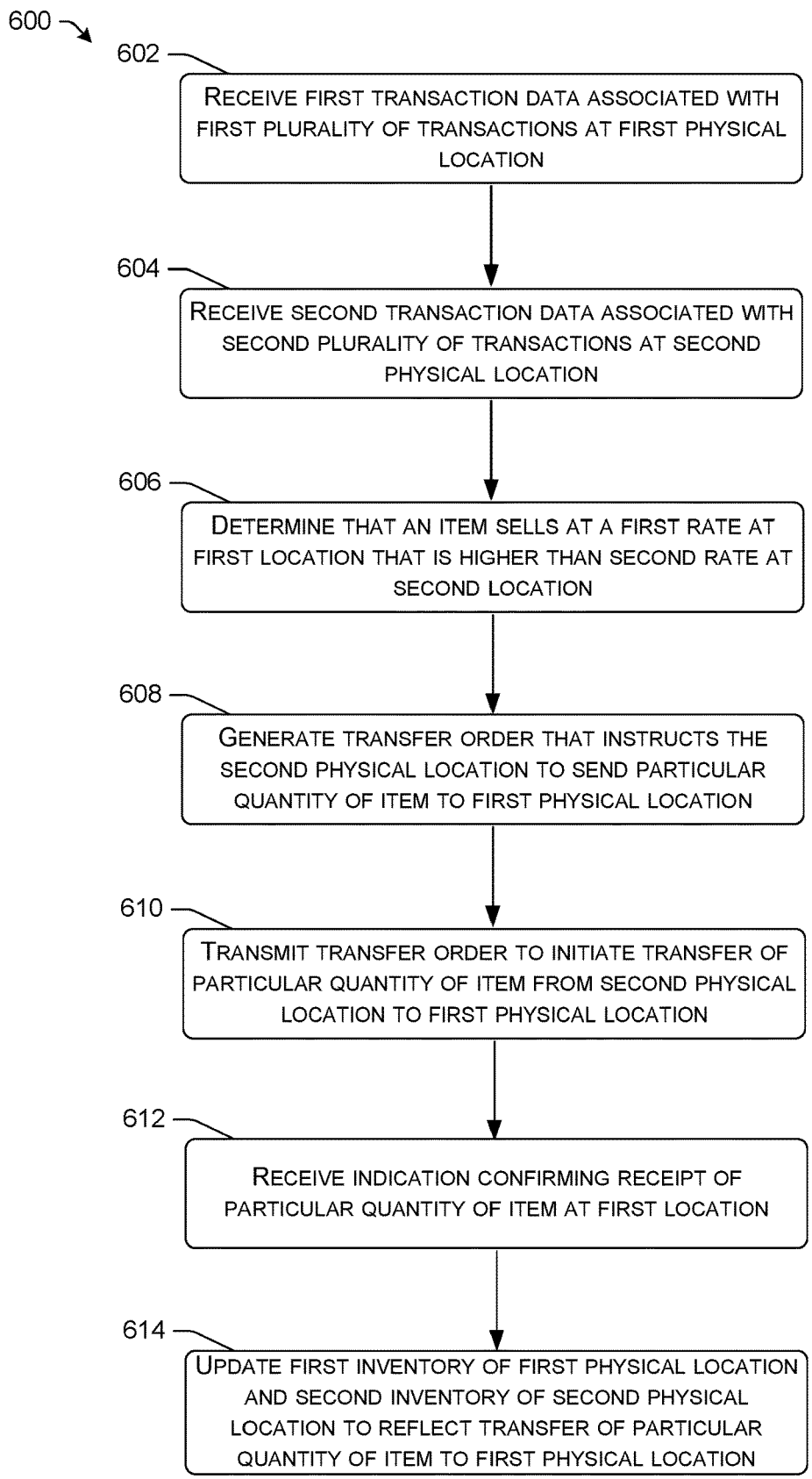
FIG. 6 illustrates a flow diagram of an example process for receiving transaction data from point-of-sale devices of a merchant, determining rates of sale of an item at different locations of the merchant based on the transaction data, and generating a transfer order to initiate a transfer of items between the locations based on the rates of sale for the item at each of the locations.

FIG. 6 illustrates a flow diagram of an example process 600 for receiving transaction data from point-of-sale devices 118 of a merchant 102, determining rates of sale of an item 106 at different physical locations 112 of the merchant 102 based on the transaction data, and generating a transfer order to initiate a transfer of items between the locations based on the rates of sale for the item at each of the locations.

At 602, a payment service 108 may receive, from a first POS device 118A associated with a merchant 102, first transaction data associated with a first plurality of transactions at a first physical location 112A.

At 604, the payment service 108 may receive, from a second POS device 118B associated with a merchant 102, second transaction data associated with a second plurality of transactions at a second physical location 112B.

At 606, a rebalancing module 132 of the payment service 108 may determine, based at least in part on the first transaction data and the second transaction data, that an item 106 sells at a first rate at the first physical location 112A that is higher than a second rate at the second physical location 112B.

At 608, the rebalancing module 132 may generate, without input from the merchant 102, a transfer order that instructs the second physical location 112B to send a particular quantity of the item 106 to the first physical location 112A. In some examples, the rebalancing module 132 may generate the transfer order based at least in part on determining that the item sells faster at the first physical location 112A than at the second physical location 112B.

In some examples, the rebalancing module 132 of the payment service 108 may predict, for a future time, that the first rate will increase to a third rate that is a higher rate of sale than the first rate. For instance, the rebalancing module 132 may predict the third rate of sale by analyzing a calendar model 146 to identify a particular event associated with the first physical location 112A and occurring at the future time. In some examples, the rebalancing module 132 may predict the third rate of sale by analyzing a weather model 146 to identify a particular weather pattern associated with the first physical location 112A occurring at the future time. In even further examples, the rebalancing module 132 may predict the third rate of sale by analyzing a holiday model 146 to identify a particular holiday event associated with the first physical location 112A and occurring at the future time. The predicted rate may also be based on future sale rate associated with another proximate merchant offering a similar item for sale. Based on the third rate of sale, the rebalancing module 132 may calculate the particular quantity of the item 106 to be sent from the second physical location 112B to the first physical location 112A.

At 610, the payment service 108 may transmit the transfer order to the second POS device 118B to initiate transfer of the particular quantity of the item 106 from the second physical location 112B to the first physical location 112A.

At 612, the payment service 108 may receive, from the first POS device 118A, an indication confirming receipt of the particular quantity of the item 106 at the first physical location 112A.

In various examples, first POS device 118A may send the indication confirming receipt of the particular quantity of the item 106 in response to various triggers or events. For example, the first POS device 118A may detect that a device associated with the employee 114 (or courier service) transfer the particular quantity of the item 106 has moved within a threshold distance to the first physical location 112A. For example, a geofence around the first physical location 112A may detect a geotag associated with the device of the employee 114 performing the transfer to determine that the employee 114 is approaching the first physical location 112A. In some examples, the items 106 may be associated with a geotag, and based on updated geotag data of the items 106 at the first physical location 112A, the first POS device 118A may send the indication confirming receipt of the particular quantity of the item 106 to the payment service 108.

In some examples, the first POS device 118A may send the indication confirming receipt of the particular quantity of the item 106 in response to receiving input from the merchant 102 or employee 114 via a user interface presented on the first POS device 118.

At 614, the rebalancing module 132 may update a first inventory of the first physical location 112A and a second inventory of the second physical location 112B to reflect the particular quantity of the item 206 received at the first physical location 112A and from the second physical location 112B.

Figure 7:
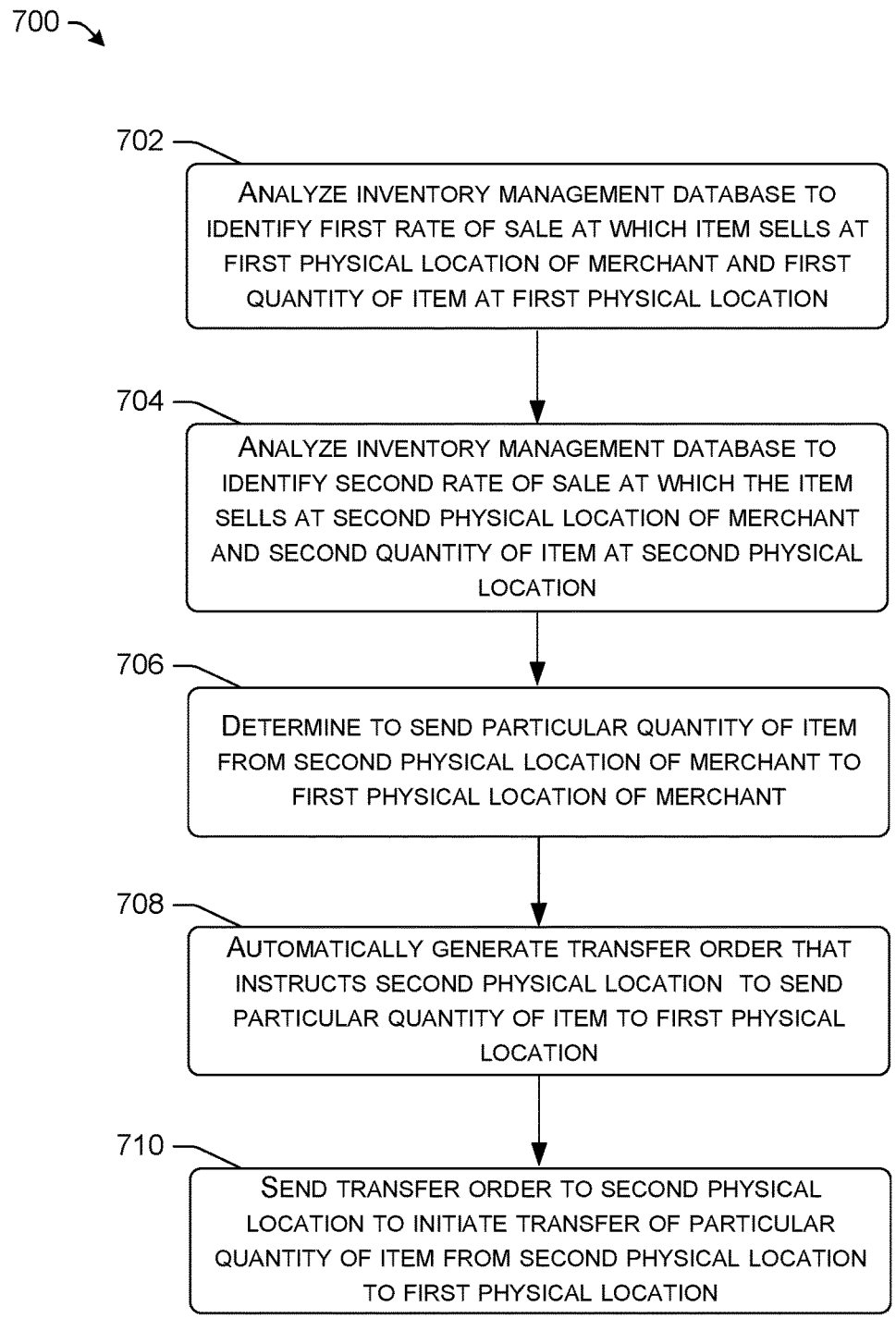
FIG. 7 illustrates a flow diagram of an example process for analyzing an inventory management database of a payment service to determine rates of sale of an item at different locations of a merchant, and generating a transfer order to transfer a quantity of the item between the locations based on the rates of sale.

FIG. 7 illustrates a flow diagram of an example process 700 for analyzing an inventory database 144 of a payment service 108 to determine rates of sale of an item 106 at different locations 112 of a merchant 102, and generating a transfer order to transfer a quantity of the item 106 between the locations 112 based on the rates of sale.

At 702, a rebalancing module 132 may analyze the inventory database 144, stored in one or more servers of a payment service 108, to identify a first rate of sale at which an item sells at a first physical location 112A of a merchant and a first quantity of the item 106 at the first physical location 112A.

In some examples, the merchant 102 may indicate that the first physical location 112A is a new location that the merchant 102 is just opening. Thus, the merchant 102 may not have collected any data for the payment service 108 to use to determine the first rate of sale at the new physical location 112A. In such examples, the rebalancing module 132 may determine rates of sales for other merchants within a threshold proximity to the merchant's 102 new physical location 112A for the same item, or similar items, and use those rates of sale to approximate what a predicted rate of sale for the merchant 102 will be at the physical location 112A.

At 704, the rebalancing module 132 may analyze the inventory database 144 to identify a second rate of sale at which an item 106 sells at a second physical location 112B of a merchant and a second quantity of the item 106 at the second physical location 112B.

At 706, the rebalancing module 132 may determine, based at least in part on one or more of the first rate of sale, the second rate of sale, the first quantity of the item 106, or the second quantity of the item 106, to send a particular quantity of the item 106 from the second physical location 112B of the merchant to the first physical location 112A of the merchant 102. In various example, the rebalancing module 132 may analyze the inventory databases 144 at predefined intervals (e.g., one day, one week, etc.) to determine whether inventories for items 106 have fallen below the minimum predefined inventory threshold. Alternatively, the rebalancing module may determine that a recent purchase for the item 106 at the first physical locating 112A causes the item quantity at the location to drop below a minimum predefined inventory threshold.

In some examples, the rebalancing module 132 may determine the particular quantity of the item 106 to send based on one or more models 146, such as a calendar model indicating events associated with the physical location 112A. Additionally, the rebalancing module 132 may analyze a weather model of the models 146 to determine that a weather pattern associated with an increase in sales will occur. As another example, the rebalancing module 132 may analyze a holiday model of the models 146 to determine a holiday is approaching. Based on analyzing the various models 146, the rebalancing module 132 may calculate the particular quantity of the item 106 to be transferred. In some examples, the models 146 may indicate historical trends at which the items 106 sold for similar types of events (e.g., weather patterns, holidays, etc.), and use those trends to determine the particular quantity of the item 106.

In some examples, the rebalancing module 132 may determine to send the particular quantity of the item 106 from the second physical location 112B to the first physical location 112A based at least in part on determining that the first rate of sale at which the item 106 sells at the first physical location 112A of the merchant 102 is higher than the second rate of sale at which the item 106 sells at the second physical location 112B of the merchant 102.

At 708, the rebalancing module may automatically generate, without input from the merchant 102, a transfer order that instructs the second physical location 112B to send the particular quantity of the item 106 to the first physical location 112A.

At 710, the payment service 108 may send to a point-of-sale (POS) device 118B associated with the second physical location 112B, the transfer order to initiate transfer of the particular quantity of the item 106 from the second physical location 112B to the first physical location 112A.

In some examples, transfer order may include a recommendation to have an employee 114 transfer the particular quantity of the item 106. For instance, the rebalancing module 132 may further analyze the employment database 128 to determine an employee 114 to use to transfer the particular quantity of the item 106 from the second physical location 112B to the first physical location 112A. For example, the rebalancing module 132 may determine, based on a shift schedule of the employee 144 stored in the employment database 142, that the employee 114 is scheduled to work a swing shift between the two physical locations 112B and 112A, or otherwise work two shifts within close enough temporal proximity, that the employee 114 may transfer the items 106 on behalf of the merchant 102.

Figure 8:
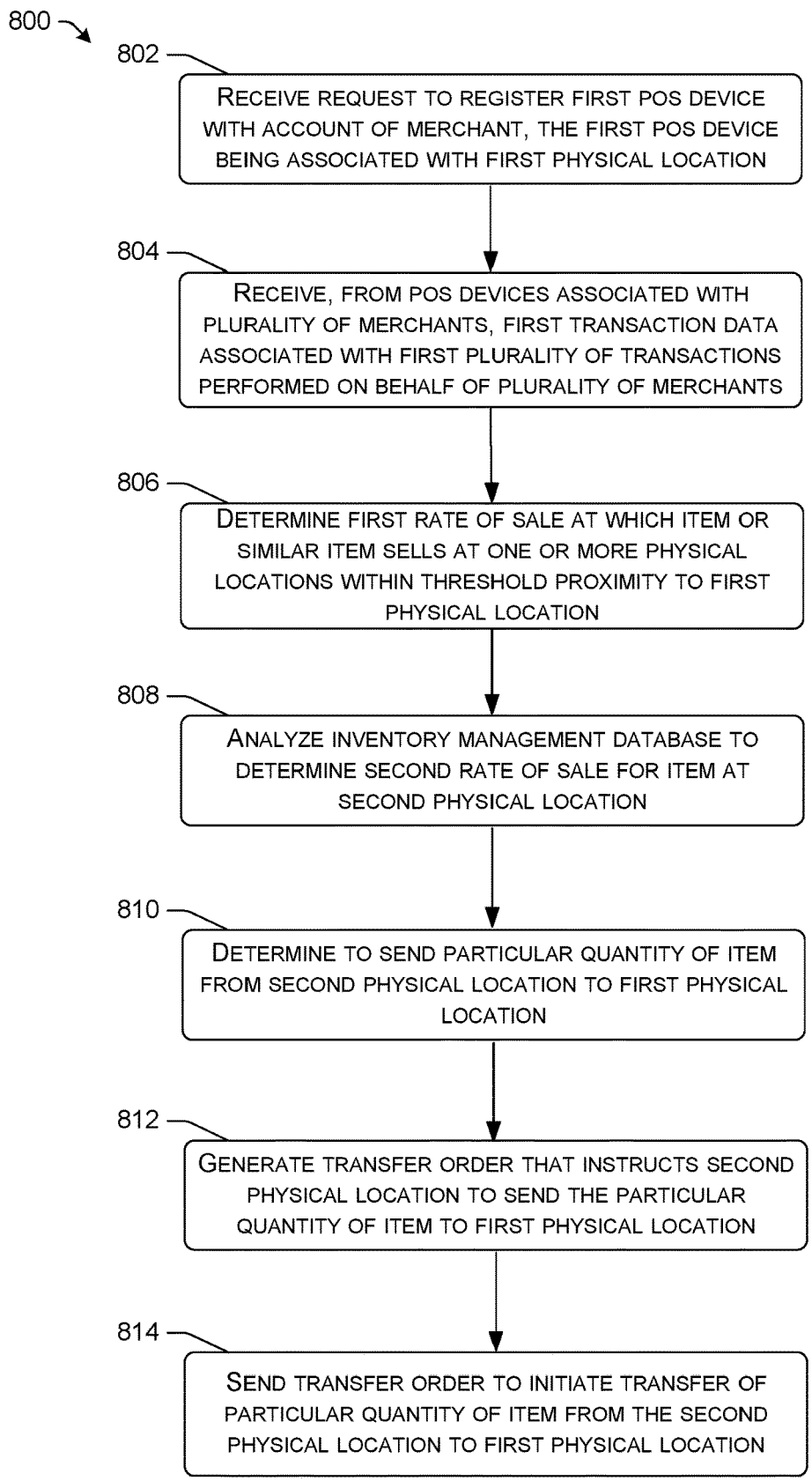
FIG. 8 illustrates a flow diagram of an example process for predicting a rate of sale of an item for a new location of a merchant based on rates of sale determined for other merchants, and generating a transfer order to transfer items from a location to the new location based on the predicted rate of sale.

FIG. 8 illustrates a flow diagram of an example process 800 for predicting a rate of sale of an item 106 for a new location 112A of a merchant 102 based on rates of sale determined for other merchants 102, and generating a transfer order to transfer items from a location 112B to the new location 11A based on the predicted rate of sale.

At 802, the payment service 108 may receive a request to register a first point-of-sale (POS) device 118A with an account of a merchant 102 associated with the payment service 108, wherein the first POS device 118A is associated with a first physical location 112A.

At 804, the payment service 108 may receive, from point-of-sale (POS) devices 118 associated with a plurality of merchants 102, first transaction data associated with a first plurality of transactions to be performed on behalf of the plurality of merchants 102, wherein the POS devices 112 are each at one or more physical locations 112 within a threshold proximity to the first physical location 112A.

At 806, a rebalancing module 132 may determine, based at least in part on the first transaction data, a first rate of sale at which an item 106, or another item similar to the item 106, sells at the one or more physical locations 112 within the threshold proximity to the first physical location 112A.

In some examples, the rebalancing module 132 may analyze one or more attributes of the first transaction data, such as a geographic location of the first physical location, a merchant type of the plurality of merchants, an item type of the item or the other item, or a price associated with the item or the other item. The rebalancing module 132 may further store a correlation between determining the first rate of sale and the one or more attributes of the first transaction data analyzed by the one or more machine-learning algorithms. Additionally, the rebalancing module 132 may determine a confidence value associated with the correlation between determining the first rate of sale and the one or more attributes of the first transaction data analyzed by the one or more machine-learning algorithms, and store an indication of the confidence value associated with the correlation.

At 808, the rebalancing module 132 may analyze an inventory database 144, stored in one or more servers of the payment service 108, to determine a second rate of sale at which the item 106 sells at a second physical location 112B associated with a second POS device 118B of the merchant 102.

At 810, the rebalancing module 132 may determine, based at least in part on the first rate of sale and the second rate of sale, to send a particular quantity of the item 106 from the second physical location 112B to the first physical location 112A.

At 812, the rebalancing module 132 may generate, without input from the merchant 102, a transfer order that instructs the second physical location 112B to send the particular quantity of the item 106 to the first physical location 112A.

At 814, the payment service 108 may send the transfer order to the second POS device 118B to initiate transfer of the particular quantity of the item 106 from the second physical location 112B to the first physical location 112A.

In some examples, initiating transfer of the particular quantity of the item 106 may include using the second POS device 118B to send a notification to a first POS device 118A at the first physical location 112B, and/or to the payment service 108, to indicate that the particular quantity of the item 106 has left the second physical location 112B. In some examples, the second POS device 118B may send the notification responsive to receiving input from the merchant 104 or employee 114 indicating that the particular quantity of the item 106 has left the second physical location 112B. In some instances, the second POS device 118B may determine (e.g., via a geofence, geotags, etc.) that a device associated with the employee 114 transferring the particular quantity of the item 106 has moved a threshold distance (e.g., 100 feet, 200 feet, etc.) away from the second physical location 112B.

In some examples, initiating the transfer of the particular quantity of the item 106 may comprise sending the merchant 102 a list of employees that could satisfy the transfer order based on a shift schedule for the merchant 102, and further sending a notification to a device associated with the employee 114 to accept or decline the transfer order. For instance, the merchant 102 may indicate, via a merchant device 118B, that the employee 114 is to complete the transfer, and upon receiving this indication, the payment service 108 may send the notification to the device associated with the employee to accept or decline the transfer.

Figure 9:
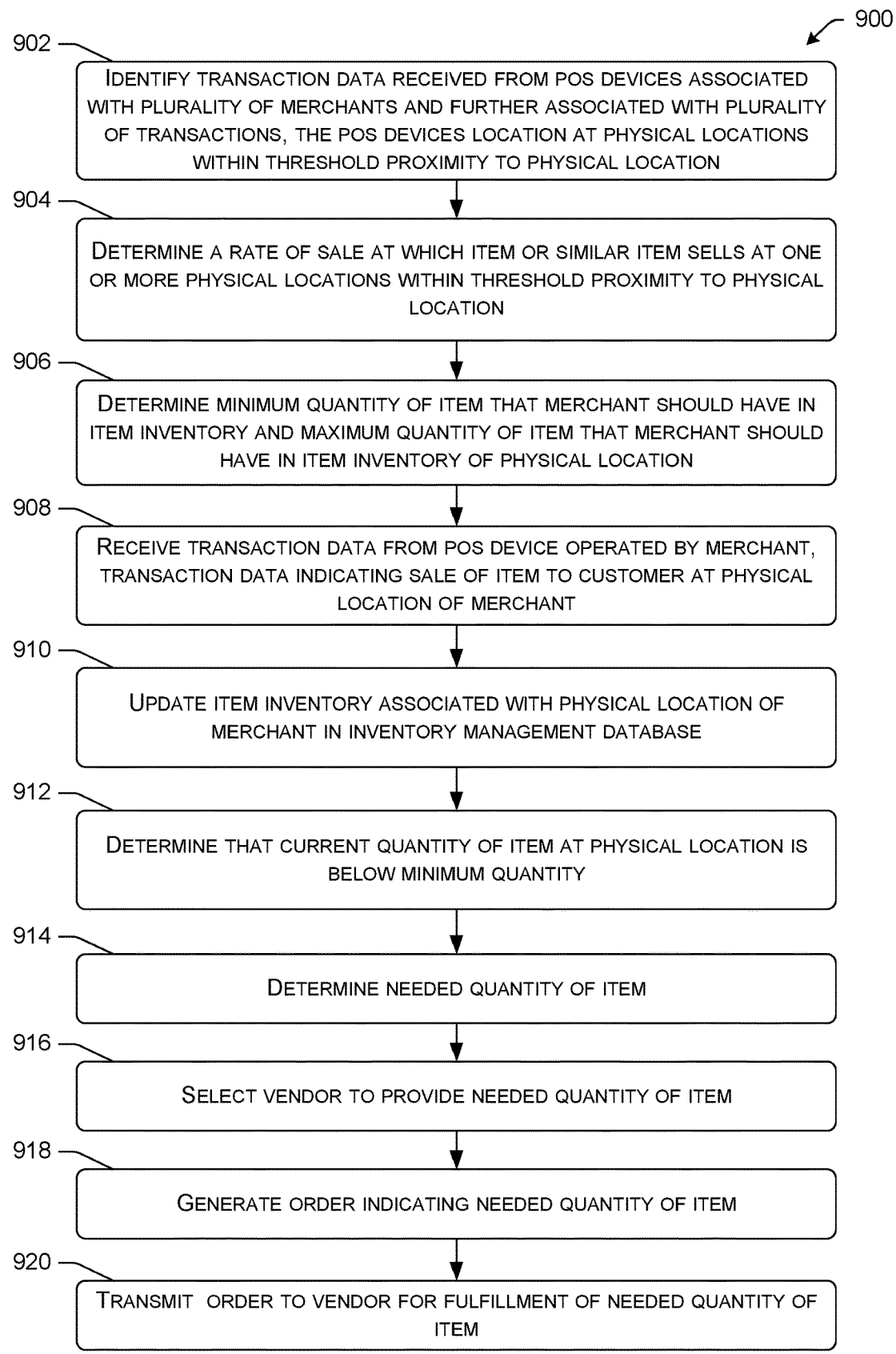
FIG. 9 illustrates a flow diagram of an example process for determining minimum and maximum quantities of an item inventory for a location of a merchant based on rates of sale for other merchants, and automatically ordering a needed quantity of the item based on a current inventory of the item at the location of the merchant.

FIG. 9 illustrates a flow diagram of an example process 900 for determining minimum and maximum quantities of an item inventory for a location 112 of a merchant 102 based on rates of sale for other merchants 102, and automatically ordering a needed quantity of the item 106 based on a current inventory of the item at the location 112A of the merchant 102.

At 902, a replenishment module 130 may identify transaction data received from point-of-sale (POS) devices 118 associated with the plurality of merchants 102 and further associated with a plurality of transactions performed on behalf of the plurality of merchants 102, wherein the POS devices 118 are each at one or more physical locations 112 within a threshold proximity to a physical location 112A.

At 904, the replenishment module 130 may determine, based at least in part on the transaction data, a rate of sale at which an item 106 or a similar item sells at the one or more physical locations 112 within the threshold proximity to the physical location 112A.

At 906, the replenishment module 130 may determine, based at least in part on the rate of sale, a minimum quantity of the item 106 that a merchant 102 should have in an item inventory associated with the physical location 112A of the merchant and a maximum quantity of the item 106 that the merchant 102 should have in the item inventory associated with the physical location 112A.

For example, the replenishment module 130 may determine the minimum and maximum quantities of the items 106 for a physical location 112A based on data of other merchants 102 who sell the item 106, or a similar item 106, at locations 112 near the physical location 112A. This may be particularly helpful for merchants 102 who are putting in a new physical location 112A to sell the item in an area they are unaware of how well the item 106 will sell. For instance, the replenishment module 130 may look at minimum and maximum thresholds for the other merchants 102, rates of sale for the other merchants 102, or other data. In some examples, if the merchant 102 has recently begun selling the item 106 at the particular location 112A, the replenishment module 130 may determine minimum and maximum thresholds based on the thresholds for other similar items the merchant 102 sells at that location.

At 908, the payment service 108 may receive transaction data from a point-of-sale (POS) device 112A operated by the merchant 102, the transaction data indicating a sale of the item 106 to a customer 104 at the physical location 112A of the merchant 102.

At 910, the replenishment module 130 may update the item inventory associated with the physical location 112A of the merchant 102 in the inventory database 144 based at least in part on the sale of the item 106.

At 912, the replenishment module 130 may determine, based at least in part on the item inventory, that a current quantity of the item 106 at the physical location 112A is below the minimum quantity.

At 914, the replenishment module 130 may determine, based at least in part on the current quantity of the item and the maximum quantity of the item, a needed quantity of the item 106. For example, the replenishment module 130 may calculate a difference between the current quantity of the item, and the maximum quantity of the item, and determine the needed quantity of the item 106 is that difference At 916, the replenishment module 130 may select a vendor 116 to provide the needed quantity of the item 106. In some examples, the vendor may be selected based on price of the item, a distance the vendor is from the merchant's location, and/or an average historical time from placing an order until a merchant 102 receives the order.

At 918, the replenishment module 130 may automatically generate, without input from the merchant 102, an order indicating the needed quantity of the item 106. At 920, the payment service 108 may transmit the order to the vendor 116 for fulfillment of the needed quantity of the item 106.

In various examples, the replenishment module 130 may calculate a date or time at which to send the order to the vendor. For instance, the replenishment module 130 may identify a date by which the merchant expects to receive the needed quantity of the item, and determine, based on historical delivery time data associated with the vendor, an expected time for the vendor to deliver the needed quantity of the item. Further, the replenishment module 130 may determine a time at which to send the order to the vendor for fulfillment of the needed quantity of the item based at least in part on the expected time.

In some examples, transmitting the order by the payment service 108 may be based on various thresholds for the minimum quantity of the item 106. For example, there may be a first minimum quantity of the item 106 threshold that, when the inventory of the item is at or approaching, the payment service 108 may transmit the order to a merchant device 118 associated with the merchant 102. For instance, the payment service 108 may determine that a current quantity of the item is approaching or at the first minimum quantity of the item 106 threshold, and after generating the transfer order, the payment service 108 may send the order to the merchant device 118 to receive approval of the transfer order. The merchant 102 may provide input, such as via a user interface presented on the merchant device 118, that the payment service 108 should proceed with the order. The payment service may, upon receiving approval from the merchant 102 via the merchant device 118, transmit the order to the vendor.

In other examples, transmitting the order by the payment service 108 may be performed automatically and without input from a merchant 102. For instance, the payment service 108 may determine that a current quantity of the item 108 is at or below a second minimum quantity of the item 106 threshold. In some examples, the second minimum quantity of the item 106 threshold may be lower than the first minimum quantity of the item 106 threshold. If the payment service 108 determines that the current quantity of the item is approaching, at, or below the second minimum quantity of the item 106 threshold, the payment service may automatically transmit the order to the vendor without receiving input from the merchant 102.

Figure 10:
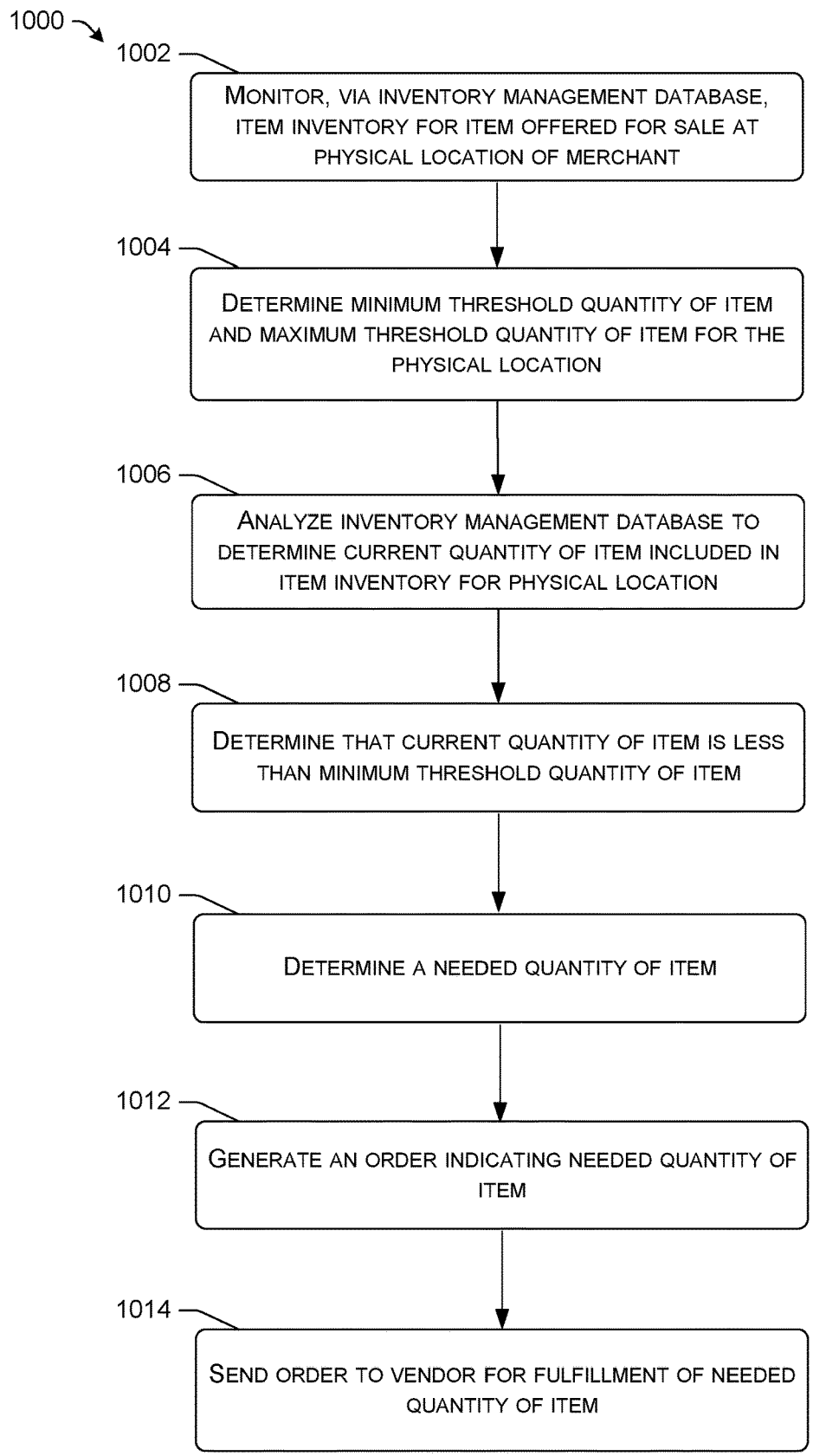
FIG. 10 illustrates a flow diagram of an example process for determining minimum and maximum quantities of an item inventory for a location of a merchant, and automatically ordering a needed quantity of the item based on a current inventory of the item at the location of the merchant.

FIG. 10 illustrates a flow diagram of an example process 1000 for determining minimum and maximum quantities of an item inventory for a location 112A of a merchant 102, and automatically ordering a needed quantity of the item 106 based on a current inventory of the item 106 at the location of the merchant 102.

At 1002, a replenishment module 130 may monitor, via an inventory database 144 stored in one or more servers of a payment service 108, an item inventory for an item 106 offered for sale at a physical location 112A of a merchant 102.

At 1004, the replenishment module 130 may determine a minimum threshold quantity of the item which indicates that the merchant 102 should order more of the item for the physical location 112A and a maximum threshold quantity of the item which indicates a maximum amount of the item the merchant 102 should have at the physical location 112A.

In some examples, the replenishment module 130 may determine to increase or decrease at least one of the minimum threshold quantity of the item or the maximum threshold quantity of the item. For instance, the replenishment module 130 may analyze historical transaction data associated with the physical location of the merchant to determine that a rate of sale of the item has increased, or decreased, over time. Further, the replenishment module 130 may determine that a competing merchant has closed, or opened, a location within a threshold proximity to the physical location. In some examples, the replenishment module 130 may determine a number of merchants within a threshold proximity to the physical location 112 which sell the item or a similar item. If there are a relatively high number of merchants (10, 20, 30, etc.) nearby the physical location (e.g., 1 miles, 5 miles, 20 miles, etc.), the replenishment module may determine to decrease the threshold quantities, and increase the threshold quantities if there are a relatively low number of merchants (e.g., 0, 1, 2, etc.). Additionally, the replenishment module 130 may analyze a calendar model to identify a particular event associated with the physical location and occurring at a future time, analyze a weather model to identify a particular weather pattern associated with the physical location occurring at the future time, and/or analyze a holiday model to identify a particular holiday event associated with the physical location and occurring at the future time. Based on predicted sales and/or rate of sales associated with other nearby merchants, the replenishment module 130 may then either dynamically increase or decrease, without input from the merchant, the at least one of the minimum threshold quantity of the item or the maximum threshold quantity of the item, or alternatively send a recommendation to a merchant computing device 118 associated with the merchant 102 to increase or decrease the at least one of the minimum threshold quantity of the item or the maximum threshold quantity of the item.

At 1006, the replenishment module 130 may analyze the inventory database 144 to determine a current quantity of the item included in the item inventory for the physical location 112A.

At 1008, the replenishment module 130 may determine that the current quantity of the item is less than the minimum threshold quantity of the item 106. At 1010, the replenishment module may determine, based at least in part on the current quantity of the item 106 and the maximum threshold quantity of the item, a needed quantity of the item 106.

In some examples, the replenishment module 130 may determine that a previous order has been placed with the vendor or another vendor for another quantity of the item 106, wherein the previous order is being processed by the vendor or other vendor or is in transit to the physical location. The replenishment module 130 may determine the needed quantity of the item 106 based on the other quantity of the item in the previous order, the current quantity of the item, and the minimum threshold quantity of the item.

At 1012, the replenishment module 130 may generate, by the one or more servers of the payment service 108 and without input from the merchant 102, an order indicating the needed quantity of the item 106. At 1014, the replenishment module 130 may send the order to a vendor 116 for fulfillment of the needed quantity of the item.

In some examples, generating the order may include generating a form and/or populating the form with information about the item 106 (e.g., required quantity, item description, item price, etc.), the merchant 102 (e.g., merchant name, physical location 112 address, etc.), and/or payment information associated with the merchant 102 (e.g., payment account of merchant 102, payment instrument information, etc.).

Figure 11:
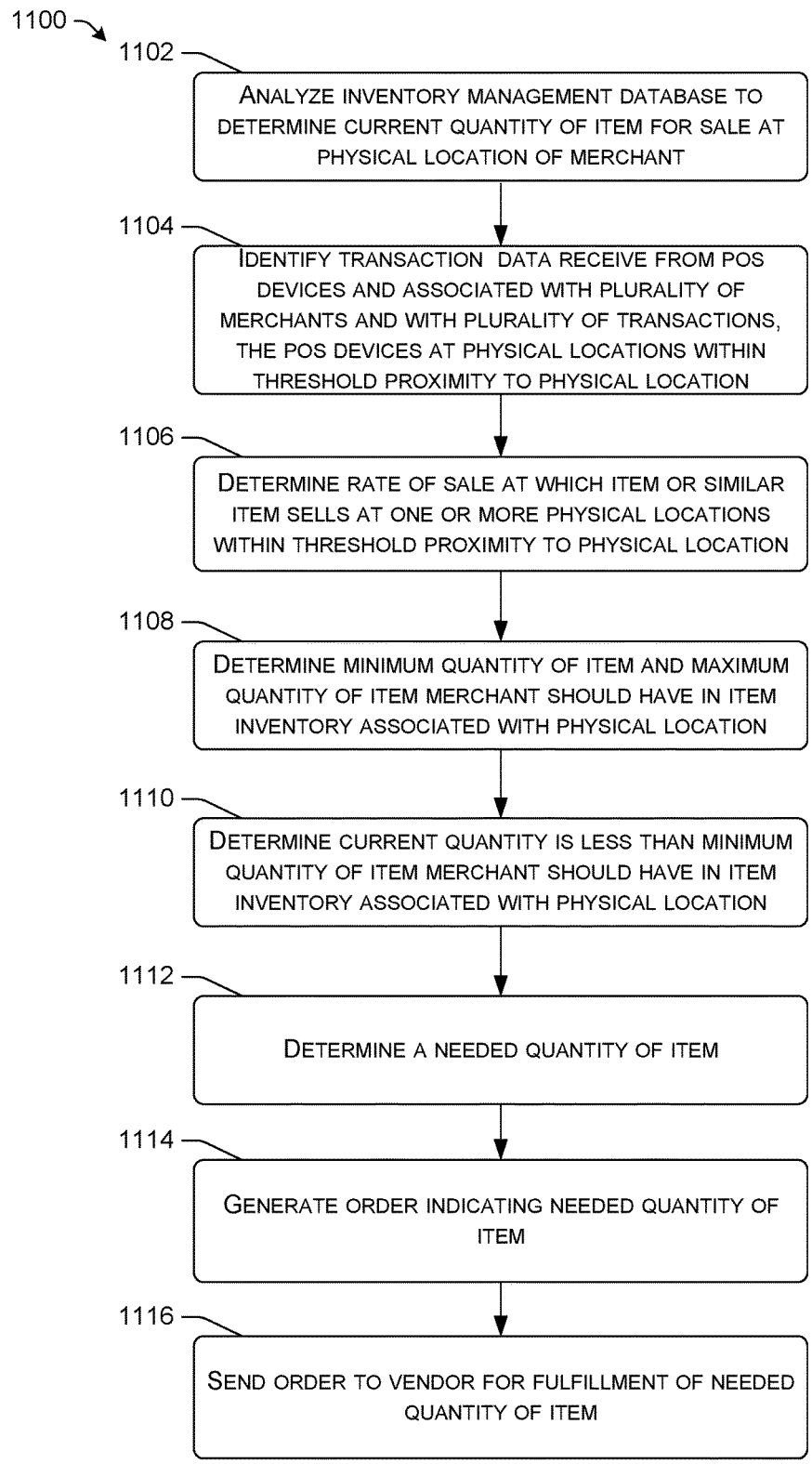
FIG. 11 illustrates a flow diagram of another example process for determining minimum and maximum quantities of an item inventory for a location of a merchant based on rates of sale for other merchants, and automatically ordering a needed quantity of the item based on a current inventory of the item at the location of the merchant.

FIG. 11 illustrates a flow diagram of another example process 1100 for determining minimum and maximum quantities of an item inventory for a location 112A of a merchant 102 based on rates of sale for other merchants 102, and automatically ordering a needed quantity of the item 106 based on a current inventory of the item at the location 112A of the merchant 102.

At 1102, a replenishment module 130 may analyze the inventory database 144 to determine a current quantity of an item offered for sale at a physical location 112A of a merchant 102.

At 1104, the replenishment module 130 may identify transaction data stored in the one or more network-based devices 108 and received from point-of-sale (POS) devices 118 associated with the plurality of merchants 102 and further associated with a plurality of transactions performed on behalf of the plurality of merchants 102, wherein the POS devices 118 are each at one or more physical locations 112 within a threshold proximity to the physical location 112A.

At 1106, the replenishment module 130 may determine, based at least in part on the transaction data, a rate of sale at which an item 106 or a similar item sells at the one or more physical locations 112 within the threshold proximity to the physical location 112A.

At 1108, the replenishment module 130 may determine, based at least in part on the rate of sale, a minimum quantity of the item that the merchant 102 should have in an item inventory associated with the physical location 112A of the merchant 102 and a maximum quantity of the item that the merchant should have in the item inventory associated with the physical location 112A.

At 1110, the replenishment module 130 may determine that the current quantity is less than the minimum quantity of the item that the merchant 102 should have in the item inventory associated with the physical location 112A.

At 1112, the replenishment module 130 may determine, based at least in part on the current quantity of the item and the maximum threshold quantity of the item, a needed quantity of the item 106.

At 1114, the replenishment module 130 may generate, by the one or more network-based computing devices 108 and without input from the merchant 102, an order indicating the needed quantity of the item 106. At 1116, the payment service 108 may send the order to a vendor 116 for fulfillment of the needed quantity of the item 106.

In some examples, the replenishment module 130 may select a new vendor by analyzing a vendor database 148. For example, the replenishment module 130 may identify prices at which a plurality of vendors provide the item to the plurality of merchants 102, identify vendor locations from which the vendors supply the item to the plurality of merchants, and/or identify average periods of time from when orders are placed by the plurality of merchants and fulfilled by the plurality of vendors. Based on this vendor information, the replenishment module 130 may select the vendor, or identify another vendor to order the item 106 from. The replenishment module 130 may simply select the vendor for the order, or select the vendor to replace an existing vendor for a future order. Alternatively, the replenishment module 130 may send a recommendation to a computing device associated with the merchant indicating the other vendor.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more servers of a payment service that processes a plurality of transactions between a plurality of different merchants and customers on behalf of the plurality of different merchants;
one or more processors located at the one or more servers;
an inventory management database, stored at the one or more servers, storing indications of item inventories of items at individual physical locations of a plurality of physical locations associated with the plurality of different merchants; and
one or more computer-readable instructions executable by the one or more processors to:
identify transaction data received from point-of-sale (POS) devices associated with the plurality of different merchants, the transaction data being associated with the plurality of transactions processed on behalf of the plurality of different merchants, wherein an individual POS device of the POS devices is associated with a respective physical location of the plurality of physical locations within a threshold proximity to a first physical location associated with a particular merchant of the plurality of different merchants;
determine, based at least in part on the transaction data, an overall rate of sale at which an item or a similar item sells at the plurality of physical locations;
determine, based at least in part on the overall rate of sale, a minimum quantity of the item that the particular merchant should have in an item inventory associated with the first physical location and a maximum quantity of the item that the particular merchant should have in the item inventory at the first physical location;
receive particular transaction data from a particular POS device, of the POS devices, operated by the particular merchant, the particular transaction data indicating a plurality of item sales to customers at the first physical location;

update the item inventory associated with the first physical location in the inventory management database based at least in part on the plurality of item sales;

determine, based at least in part on the item inventory, that a current quantity of the item at the first physical location is below the minimum quantity;

determine, based at least in part on the current quantity of the item and the maximum quantity of the item, a needed quantity of the item;

identify, based at least in part on transaction data from one or more other POS devices operated by the particular merchant and in part on item inventories at other physical locations associated with the particular merchant, a second physical location associated with the particular merchant that has the needed quantity of the item in an item inventory associated with the second physical location;

automatically generate, without input from the particular merchant, an order indicating the needed quantity of the item; and transmit, without input from the particular merchant, the order for fulfillment of the needed quantity of the item to a POS device operated by the particular merchant at the second physical location.

2. The system of claim 1, wherein determining at least one of the minimum quantity of the item or the maximum quantity of the item is further based at least in part on one or more of:

determining a number of merchants within the threshold proximity to the first physical location that sell the item or a similar item;

analyzing a calendar model to identify a particular event associated with the first physical location and occurring at a future time;

analyzing a weather model to identify a particular weather pattern associated with the first physical location occurring at the future time; or analyzing a holiday model to identify a particular holiday event associated with the first physical location and occurring at the future time.

3. The system of claim 1, wherein the one or more computer-readable instructions are further executable by the one or more processors to:

identify a date by which the particular merchant expects to receive the needed quantity of the item at the first physical location;

determine, based on historical delivery time data associated with the second physical location, an expected delivery time for the needed quantity of the item; and determine a time at which to send the order to the second physical location for fulfillment of the needed quantity of the item based at least in part on the expected delivery time, wherein the order is sent to the second physical location based at least in part on the time.

4. The system of claim 1, wherein the one or more computer-readable instructions are further executable by the one or more processors to:

determine another rate of sale at which the item sells at the first physical location associated with the particular merchant; and modify at least one of the minimum quantity of the item or the maximum quantity of the item based at least in part on the other rate of sale.

5. The system of claim 1, wherein the one or more computer-readable instructions are further executable by the one or more processors to:

receive, from the POS device operated by the particular merchant at the second physical location, a notification that the second physical location is unable to fulfill the order;

based at least in part on receiving the notification, sending the order to a vendor for fulfillment of the needed quantity of the item.

6. The system of claim 5, wherein the one or more computer-readable instructions are further executable by the one or more processors to:

determine that the vendor only fulfills orders of the item over a minimum threshold order for the item, wherein the minimum threshold order for the item is greater than the needed quantity of the item for the merchant;

identify one or more other merchants requiring orders of other quantities of the item;

perform a batch order of the item from the vendor by combining the needed quantity of the item and the other quantities of the item, wherein the batch order is greater than the minimum threshold order for the item; and cause the needed quantity of the batch order of the item to be distributed to first physical location, and the other quantities of the item of the batch order to be distributed to the one or more other merchants.

7. The system of claim 1, wherein the one or more computer-readable instructions are further executable by the one or more processors to:

determine a value associated with the particular merchant wherein the value is determined based at least in part on:

a current sale rate at which the particular merchant is selling the item;

a price at which the particular merchant is selling the item;

a historical seasonal sale rate for the item, wherein the historical seasonal sale rate is associated with a current season or a next season for the first physical location; or an event sale rate for the item indicating a rate at which the particular merchant sells the item for a future event or holiday;

determine, based at least in part on the value associated with the particular merchant, to provide, from the payment service, at least a portion of capital required to buy the needed quantity of the item.

8. The system of claim 1, wherein the one or more computer-readable instructions are further executable by the one or more processors to:

identify, from an employee management model, an employee shift schedule for employees of the merchant;

identify, from the employee shift schedule, a particular employee scheduled to work an initial shift at the second physical location and a subsequent shift at the first physical location, the initial shift and the subsequent shift being within a threshold period of time, wherein the order includes a recommendation to have the particular employee transport the particular quantity of the particular item from the second physical location after the initial shift to the first physical location for the subsequent shift.

9. A method comprising:
monitoring, via an inventory management database stored in one or more servers of a payment service, an item inventory for an item offered for sale at a first physical location of a merchant;
determining, by the one or more servers of the payment service, a minimum threshold quantity of the item which indicates that the merchant should order more of the item for the first physical location and a maximum threshold quantity of the item which indicates a maximum amount of the item the merchant should have at the first physical location;
analyzing, by the one or more servers of the payment service, the inventory management database to determine a current quantity of the item included in the item inventory for the first physical location and a plurality of other physical locations of the merchant;
determining, by the one or more servers of the payment service, that the current quantity of the item included in the item inventory for the first physical location is less than the minimum threshold quantity of the item;
determining, by the one or more servers of the payment service and based at least in part on the current quantity of the item and the maximum threshold quantity of the item included in the item inventory for the first physical location, a needed quantity of the item;
identifying, by the one or more servers of the payment service and based at least in part on particular transaction data from the merchant and in part on item inventories at one or more of the plurality of other physical locations of the merchant, a second physical location of the merchant that has the needed quantity of the item in an item inventory associated with the second physical location, wherein the particular transaction data is received from a point-of-sale (POS) device associated with the merchant and associated with a plurality of transactions processed on behalf of the merchant, wherein the POS device is at the first physical location;
generating, by the one or more servers of the payment service and without input from the merchant, an order indicating the needed quantity of the item; and
sending, by the one or more servers of the payment service and without input from the merchant, the order to a second physical location of the merchant for fulfillment of the needed quantity of the item.

10. The method of claim 9, wherein determining the minimum threshold quantity of the item and the maximum threshold quantity of the item comprises:
identifying other transaction data received from POS devices associated with a plurality of different merchants and further associated with a plurality of other transactions processed on behalf of the plurality of different merchants, wherein individual POS devices of the POS devices are at one or more physical locations within a threshold proximity to the first physical location;
determining, based at least in part on the other transaction data, a rate of sale at which an item or a similar item sells at the one or more physical locations within the threshold proximity to the first physical location; and
calculating the minimum threshold quantity of the item and the maximum threshold quantity of the item based at least in part on the rate of sale at which the item or the similar item sells at the one or more physical locations within the threshold proximity to the first physical location.

11. The method of claim 9, further comprising:
determining, by the one or more servers of the payment service, that a previous order has been placed with a vendor for another quantity of the item, wherein the previous order is being processed by the vendor or is in transit to the first physical location,
wherein determining the needed quantity of the item comprises calculating the needed quantity of the item based at least in part on the other quantity of the item in the previous order, the current quantity of the item, and the minimum threshold quantity of the item.

12. The method of claim 9, further comprising:
determining, by the one or more servers of the payment service, to increase at least one of the minimum threshold quantity of the item or the maximum threshold quantity of the item, the determining comprising at least one of:
analyzing historical transaction data associated with the first physical location of the merchant to determine that a rate of sale of the item has increased over time;
determining that a competing merchant has closed a location within a second threshold proximity to the first physical location;
analyzing a calendar model to identify a particular event associated with the first physical location and occurring at a future time;
analyzing a weather model to identify a particular weather pattern associated with the first physical location occurring at the future time, wherein the particular weather pattern is associated with an increased rate of sale of the item; or
analyzing a holiday model to identify a particular holiday event associated with the first physical location and occurring at the future time; and
based at least in part on the determining to increase the at least one of the minimum threshold quantity of the item or the maximum threshold quantity of the item, performing, by the one or more servers of the payment service, at least one of:
dynamically increasing, without input from the merchant, the at least one of the minimum threshold quantity of the item or the maximum threshold quantity of the item; or
sending a recommendation to a computing device associated with the merchant to increase the at least one of the minimum threshold quantity of the item or the maximum threshold quantity of the item.

13. The method of claim 9, further comprising:
determining, by the one or more servers of the payment service, to decrease at least one of the minimum threshold quantity of the item or the maximum threshold quantity of the item, the determining comprising at least one of:
analyzing historical transaction data associated with the first physical location of the merchant to determine that a rate of sale of the item has decreased over time;
determining that a competing merchant has opened a location within a second threshold proximity to the first physical location;
analyzing a weather model to identify a particular weather pattern associated with the first physical location occurring at the future time, wherein the particular weather pattern is associated with a decreased rate of sale of the item; or
analyzing a calendar model to determine that a particular event associated with the first physical location has ended, wherein the particular event is associated with an increased rate of sale of the item;

based at least in part on the determining to decrease the at least one of the minimum threshold quantity of the item or the maximum threshold quantity of the item, performing, by the one or more servers of the payment service, at least one of:

dynamically decreasing, without input from the merchant, the at least one of the minimum threshold quantity of the item or the maximum threshold quantity of the item; or sending a recommendation to a computing device associated with the merchant to decrease the at least one of the minimum threshold quantity of the item or the maximum threshold quantity of the item.

14. The method of claim 9, further comprising:

determining, by the one or more servers of the payment service, that the item has an expiration date shorter than an average expiration date associated with other items sold by the merchant; and based at least in part on determining that the item has an expiration date shorter than the average expiration date, dynamically decreasing, by the one or more servers of the payment service, at least one of the minimum threshold quantity of the item or the maximum threshold quantity of the item.

15. The method of claim 9, further comprising:

analyzing, by the one or more servers of the payment service, the inventory management database to determine that another merchant has extra inventory of the item;

determining, by the one or more servers of the payment service, that the other merchant will sell the extra inventory of the item at a discounted price; and sending, by the one or more servers of the payment service, a notification to a computing device associated with the merchant indicating that the other merchant will sell the extra inventory of the item at the discounted price.

16. One or more network-based computing devices operating a payment service to process a plurality of transactions on behalf of a plurality of different merchants, the one or more network-based computing devices comprising:

one or more processors;

an inventory management database, stored at the one or more network-based computing devices, storing indications of item inventories of items at individual physical locations of respective merchants of the plurality of different merchants;

one or more computer-readable instructions executable by the one or more processors to:

analyze the inventory management database to determine a current quantity of an item offered for sale at a first physical location of a particular merchant of the plurality of different merchants;

identify transaction data stored in the one or more network-based computing devices and received from point-of-sale (POS) devices associated with the plurality of different merchants, the transaction data being associated with the plurality of transactions processed on behalf of the plurality of different merchants, wherein an individual POS device of the POS devices is at a physical location of a plurality of physical locations within a threshold proximity to the first physical location;

determine, based at least in part on the transaction data, an overall rate of sale at which an item or a similar item sells at the plurality of physical locations within the threshold proximity to the first physical location;

determine, based at least in part on the overall rate of sale, a minimum quantity of the item that the particular merchant should have in an item inventory associated with the first physical location and a maximum quantity of the item that the particular merchant should have in the item inventory associated with the first physical location;

determine that the current quantity is less than the minimum quantity;

determine, based at least in part on the current quantity and the maximum quantity, a needed quantity of the item;

identify, based at least in part on transaction data from one or more other POS devices operated by the particular merchant and in part on item inventories at other physical locations of the particular merchant, a second physical location associated with the particular merchant that has the needed quantity of the item in an item inventory associated with the second physical location;

generate, without input from the particular merchant, an order indicating the needed quantity of the item; and transmit, without input from the particular merchant, the order to the second physical location of the particular merchant for fulfillment of the needed quantity of the item.

17. The one or more network-based computing devices of claim 16, wherein the one or more computer-readable instructions are further executable by the one or more processors to:

determine that the item has an expiration date shorter than an average expiration date associated with other items sold by the particular merchant; and based at least in part on determining that the item has the expiration date shorter than the average expiration date, dynamically decreasing at least one of the minimum quantity of the item or the maximum threshold quantity of the item.

18. The one or more network-based computing devices of claim 16, wherein the one or more computer-readable instructions are further executable by the one or more processors to analyze the inventory management database to determine the current quantity of the item offered for sale at the first physical location of the particular merchant based on at least one of:

receiving transaction data from a point-of-sale (POS) device operated by the particular merchant at the first physical location, the transaction data indicating a sale of the item to a customer at the first physical location of the particular merchant; or detecting a time at which to periodically analyze the inventory management database to identify current quantities of item inventories.

19. The one or more network-based computing devices of claim 16, wherein the one or more computer-readable instructions are further executable by the one or more processors to:

determine to increase at least one of the minimum quantity of the item or the maximum quantity of the item, the determining comprising at least one of:

analyzing historical transaction data associated with the first physical location of the particular merchant to determine that a rate of sale of the item has increased over time;

determining that a competing merchant has closed a location within a second threshold proximity to the first physical location;

analyzing a calendar model to identify a particular event associated with the first physical location and occurring at a future time;

analyzing a weather model to identify a particular weather pattern associated with the first physical location occurring at the future time, wherein the particular weather pattern is associated with an increased rate of sale of the item; or analyzing a holiday model to identify a particular holiday event associated with the first physical location and occurring the future time; and based at least in part on the determining to increase the at least one of the minimum quantity of the item or the maximum quantity of the item, perform at least one of:

dynamically increase, without input from the merchant, the at least one of the minimum threshold quantity of the item or the maximum quantity of the item; or send a recommendation to a computing device associated with the merchant to increase the at least one of the minimum quantity of the item or the maximum quantity of the item.

20. The one or more network-based computing devices of claim 16, wherein the one or more computer-readable instructions are further executable by the one or more processors to:

identify a date by which the particular merchant expects to receive the needed quantity of the item at the first physical location;

determine, based on historical delivery time data associated with a vendor, an expected delivery time for the second physical location to deliver the needed quantity of the item to the first physical location; and determine a time at which to send the order to the second physical location for fulfillment of the needed quantity of the item based at least in part on the expected delivery time, wherein the order is sent to the second physical location based at least in part on the time.

* * * * *